US005254823A

United States Patent [19]

McKee et al.

[11] Patent Number: 5,254,823

[45] Date of Patent: Oct. 19, 1993

[54] QUICK-COOKING OVEN

[75] Inventors: Philip R. McKee, Wichita, Kans.; Earl R. Winkelmann, Garland, Tex.

[73] Assignee: Turbochef Inc., Wichita, Kans.

[21] Appl. No.: 761,285

[22] Filed: Sep. 17, 1991

[51] Int. Cl.[5] ........ B23K 15/10

[52] U.S. Cl. ........ 219/10.55 R; 219/10.55 A; 219/10.55 B; 219/10.55 F; 219/400; 219/401; 126/21 R; 126/21 A; 221/150 A; 221/150 R

[58] Field of Search ........ 219/10.55 A, 10.55 B, 219/10.55 F, 10.55 R, 10.55 M, 10.55 E, 400, 401, 378, 399; 126/21 H, 21 R; 221/150 A, 150 R, 150 HC

[56] References Cited

U.S. PATENT DOCUMENTS

| | | | |
|---|---|---|---|
| 2,495,429 | 1/1950 | Spencer | 219/10.55 B |
| 2,575,426 | 11/1951 | Parnell | 219/478 |
| 2,885,294 | 5/1959 | Larson et al. | 99/403 |
| 3,235,971 | 2/1966 | Tooby | 219/10.55 R |
| 3,556,817 | 1/1971 | Jeppson | 99/470 |
| 3,578,463 | 5/1971 | Smith et al. | 219/10.55 M |
| 3,692,968 | 9/1972 | Yasuoka | 219/10.55 E |
| 3,872,603 | 3/1975 | Williams et al. | 219/10.55 A |
| 3,889,009 | 6/1975 | Lipoma | 219/10.55 R |
| 4,154,861 | 5/1979 | Smith | 219/10.55 M |
| 4,178,494 | 12/1979 | Bottalico et al. | 219/10.55 R |
| 4,233,495 | 11/1980 | Scoville et al. | 126/21 A |
| 4,289,792 | 9/1981 | Smith | 219/10.55 R |
| 4,311,895 | 1/1982 | Tanabe | 219/10.55 B |
| 4,377,109 | 3/1983 | Brown et al. | 219/388 |
| 4,384,191 | 5/1983 | Guibert | 219/400 |
| 4,405,850 | 9/1983 | Edgar | 219/10.55 A |
| 4,409,453 | 10/1983 | Smith | 219/10.55 A |
| 4,419,374 | 12/1983 | Pei | 219/10.55 R |
| 4,439,459 | 3/1984 | Swartley | 219/400 |
| 4,471,000 | 9/1984 | Brown et al. | 219/388 |
| 4,533,809 | 8/1985 | Eke | 219/10.55 M |
| 4,587,393 | 5/1986 | Ueda | 219/10.55 B |
| 4,647,746 | 3/1987 | Eke | 219/10.55 B |
| 4,687,895 | 8/1987 | Chitre et al. | 219/10.55 M |
| 4,778,970 | 10/1988 | Klaila | 219/10.55 A |
| 4,794,219 | 12/1988 | Eke | 219/10.55 M |
| 4,835,351 | 5/1989 | Smith et al. | 219/10.55 R |
| 4,839,502 | 6/1989 | Swanson et al. | 219/405 |
| 4,841,125 | 6/1989 | Edamura | 219/10.55 B |
| 4,951,645 | 8/1990 | Luebke et al. | 126/21 A |
| 4,952,763 | 8/1990 | Fritz | 219/10.55 F |
| 4,960,100 | 10/1990 | Pellicane | 126/21 R |
| 4,999,471 | 3/1991 | Guarneri et al. | 219/10.55 M |
| 5,025,775 | 6/1991 | Crisp | 126/21 R |
| 5,089,679 | 2/1992 | Eke | 219/10.55 B |
| 5,128,158 | 7/1992 | Chartrain et al. | 426/233 |
| 5,134,263 | 7/1992 | Smith et al. | 219/10.55 M |
| 5,147,994 | 9/1992 | Smith et al. | 219/10.55 R |

*Primary Examiner*—Bruce A. Reynolds
*Assistant Examiner*—Tu Hoang
*Attorney, Agent, or Firm*—Amster, Rothstein & Ebenstein

[57] ABSTRACT

A hybrid oven for cooking by both hot air impingement and microwave cooking includes a housing defining a cooking chamber adapted to receive a food product for cooking, a hot air plenum configured and dimensioned to hold a large volume of air relative to the cooking chamber, and a conduit for selectively providing gaseous communication therebetween. Associated with the plenum are a thermal reservoir of high specific heat and high heat capacity relative to the air disposed in the plenum and an actuatable heater for maintaining the thermal reservoir at a high temperature. Also provided are an actuatable magnetron for microwave cooking of the product in the cooking chamber and an actuatable blower for causing impingement of air from the plenum onto the product in the cooking chambers. Controls are provided for actuating the heater to preheat the thermal reservoir and the ambient air in the plenum prior to actuation of the blower, for actuating the magnetron, and for actuating the blower at a predetermined time relative to actuation of the magnetron, whereby actuation of the blower causes the impingement of preheated air from the plenum through the conduit and onto the product in the cooking chamber.

42 Claims, 11 Drawing Sheets

QUICK-COOKING OVEN

BACKGROUND OF THE INVENTION

The present invention relates to both a hybrid oven for cooking by both hot air impingement and microwave cooking and a non-hybrid oven for cooking by hot air impingement alone, and more particularly to such an oven which is capable of rapidly cooking food products.

The "fast food" industry is based upon the premise that, due to the anticipated sales volume during peak hours, food can be prepared before an order is placed therefor. As a result, the food is usually delivered to the customer within 30 seconds of the order because the food was already prepared, typically within the last five minutes so that its quality is not degraded. However, this results in substantial inventory loss if customer traffic is less than anticipated, as well as substantial delays if customer traffic is more than anticipated, especially during off-peak hours.

Attempts to deliver "cooked to order" food of high quality within an acceptable time frame have not been entirely successful. Indeed, it is precisely this shortcoming which has prevented the creation of acceptable hot food vending machines (similar in size and concept to the well known soft-drink vending machines) which could turn out national fast food chain quality food from a fully automated machine.

A satisfactory quick-cooking oven must be able to heat or cook—from frozen, refrigerated or ambient temperature states—food products, whether they are already prepared (e.g., frozen fried chicken nuggets), partially prepared (e.g., frozen "par-baked" pizza) or raw (e.g., biscuits, fish), with the process generally being completed in less than 30 seconds. It will be readily appreciated that an oven which can complete the process in 30 seconds can enable food to be sold at twice the rate during peak hours than a machine which requires a minute, whether the oven is disposed in a fast food restaurant or is part of an automatic vending machine. Additionally, there is a threshold to the amount of time most consumers will wait for a food product to be delivered. Although there may be some debate as to what that threshold time limit is, it is clear that far fewer customers will knowingly wait for 90 seconds for delivery of their food than will wait for 30 seconds. This marginal customer group will also result in additional sales.

It will be appreciated that a quick-cooking oven is also desirable for many food items because various characteristics which change during the cooking process (such as texture, flavor, odor and appearance) may be affected in different ways during the cooking process—by which is meant, faster cooking times may in certain instances provide a higher overall quality food product than slow cooking times.

Conventional microwave ovens can deliver large amounts of heat over short periods of time, but result in a "synthetic" product, without browning or crisping. While this may be acceptable for some products, such as baked potatoes, it is generally unacceptable for a wide variety of food products such as pizzas, fried chicken, toast, etc. Conventional air impingement ovens can rapidly cook food products by forcing heated air onto the food surface at high velocities, thus "driving" the heat into the food product. Conventional hybrid ovens, which combine both hot air impingement and microwave cooking techniques, can heat and cook more rapidly than either cooking method individually. However, the known hybrid ovens are either much too slow (for example, requiring a lengthy period of as much as five minutes to cook a frozen pizza) or, if they operate on 220 volts and/or are provided with a substantial warm-up time (frequently 15 seconds or so), they can cook the same food product in a faster but still unacceptably slow period (for example, 90 seconds). The 90 second ovens typically use as heating elements heating coils similar to a hair dryer, which take several seconds to reach peak temperatures and then only heat up the air as it passes over the heating coils. Thus such ovens require a substantial warm-up time to heat the coils to peak temperatures and then additional time to heat up the air already in the oven by passing it over the coils. (It should be kept in mind that the initial batch of hot air leaving the heating coils is rapidly cooled as it mixes with the cold food product and the air already present in the cooking chamber.) While a fast food restaurant will generally have a 220 volt power supply available to it, a vending machine location may have only a 110 volt power supply available to it and thus cannot utilize one of the 90 second ovens which requires a 220 volt power supply. Because heating coils and magnetron(s) which could operate simultaneously on a 110 volt power supply would be of substantially reduced capacity as compared to heating coils and magnetron(s) which require an essentially dedicated 110 volt power supply to operate efficiently, a 220 volt power supply would be required to deliver similar cooking energy in the known hybrid ovens.

Non-hybrid hot air impingement ovens are typically not used in applications which require immediate cooking and delivery to the consumer, since the impinging hot air has only a limited ability to cook the food interior, especially where the product is of substantial dimensions. Even so, the non-hybrid hot air impingement oven of conventional design is subject to many of the same disadvantages as the hybrid oven, and in particular requires several minutes in order to cook the food by hot air impingement alone. These ovens, like the 90 second ovens, require a warm-up time of several seconds in order to reach peak temperatures in the heating coils, and then still more time in order to heat up the air already in the system by passing it over the heating coils.

Accordingly, it is an object of the present invention to provide a quick-cooking oven such as a hybrid oven generally capable of cooking most frozen foods within 30 seconds.

Another object is to provide such an oven which utilizes both hot air impingement and microwave cooking.

A further object is to provide such an oven which is operable on a 110 volt power supply.

It is also an object of the present invention to provide a quick-cooking non-hybrid oven which cooks with hot air impingement only.

It is another object to provide such a quick-cooking non-hybrid oven which is generally capable of cooking most refrigerated food products within one minute.

It is a further object to provide such an oven which is safe, simple and economical to manufacture, use and maintain.

SUMMARY OF THE INVENTION

It has now been found that the above and related objects of the present invention are obtained in a quick-cooking oven.

The first embodiment of the present invention is a hybrid oven for cooking by both hot air impingement and microwave cooking. The oven comprises a housing defining a cooking chamber adapted to receive a food product for cooking, a hot air plenum configured and dimensioned to hold a volume of air which is substantial relative to the volume of the cooking chamber, and means for selectively providing gaseous communication therebetween. Also provided are actuatable means for microwave cooking of the product in the cooking chamber, and actuatable means for causing impingement of air from the plenum onto the product in the cooking chamber. Associated with the plenum are a thermal reservoir of high specific heat and high heat capacity relative to the air disposed in the plenum, and heating means for maintaining the thermal reservoir at a high temperature. Control means are provided for actuating the microwave cooking means and the impingement-causing means in timed relation to one another.

In a preferred embodiment of the oven, the plenum has a volumetric capacity of at least 1.5 cubic feet of air in addition to the thermal reservoir and the heating means, and the thermal reservoir includes at least 60 pounds of a metal such as copper. The heating means has the capacity to preheat air in the plenum to at least 700° F. The oven operates on a 110 volt power supply and is characterized by the capability of cooking and browning most frozen or refrigerated food products placed in the cooking chamber within 30 seconds when the thermal reservoir and the air in the plenum are preheated.

Preferably the control means causes the heating means to initiate preheat of the thermal reservoir and the ambient air in the plenum at a time at least one hour prior to actuation of the impingement-causing means. The control means actuates the heating means to preheat the thermal reservoir and the ambient air in the plenum only prior to actuation and, as necessary, after deactuation of the microwave cooking means and impingement-causing means. The control means typically actuates the impingement-causing means substantially simultaneously with actuation of the microwave cooking means.

The means for selectively providing gaseous communication between the plenum and the cooking chamber precludes the passage of hot air from the plenum into the cooking chamber when the cooking chamber is not sealed, thereby to preclude hot air from the plenum escaping the oven.

Preferably the cooking chamber is configured and dimensioned to direct air from the plenum onto at least one surface of the product in the cooking chamber (preferably also the sides of the product) and reflect such air back onto and across a substantial portion of a surface of the product opposed to such at least one surface. The cooking chamber includes means, such as a centrally apertured refractory disk, restricting the passage of air from the cooking chamber to the plenum until the air has passed along substantially a radius of the opposed surface of the product. The microwaves are directed to the opposed surface of the product—that is, the surface opposite the one surface of the product onto which the impingement air is initially directed.

In a preferred embodiment the oven additionally includes a cooking tray movable (under control of the control means) between a cooking position within the cooking chamber and a loading/unloading position outside of the cooking chamber. The cooking tray includes a surface movable (under control of the control means) between a product-supporting orientation, wherein the supporting surface releasably supports the product, and an unloading orientation, wherein the supporting surface does not support the product thereon, thereby enabling the product to drop. The supporting surface is movable from the product-supporting orientation into the unloading orientation only when the cooking tray is in the loading/unloading position. Preferably the oven additionally includes a loading tray disposed above the cooking tray when the cooking tray is in the loading/unloading position. The loading tray includes a product-receiving surface movable (under control of the control means) between a product supporting orientation, wherein the product-receiving surface supports the product, and a product releasing orientation, wherein the product-receiving surface does not support the product, thereby enabling the product to drop. The product-receiving surface is movable from the product-supporting orientation into the product-releasing orientation only when the cooking tray is in the loading/unloading position.

The present invention also encompasses an oven for cooking at least in part by microwave cooking, the oven comprising a housing defining a cooking chamber adapted to receive a food product for cooking, actuatable means for microwave cooking of the product in the cooking chamber, and control means for actuating the microwave cooking means. The means for microwave cooking including a pair of magnetrons and a common waveguide therefor having a pair of legs defining a right angle, the magnetrons being disposed perpendicular to the common waveguide and feeding the microwave output thereof into respective legs of the common waveguide.

The second embodiment of the present invention is an oven for cooking by hot air impingement. The oven comprises a housing defining a cooking chamber adapted to receive a food product for cooking, a hot air plenum configured and dimensioned to hold a volume of air which is substantial relative to the volume of air in the cooking chamber, and means for selectively providing gaseous communication therebetween. Also provided is actuatable means for causing impingement of air from the plenum onto the product in the cooking chamber. Associated with the plenum are a thermal reservoir of high specific heat and high heat capacity relative to the air disposed in the plenum, and heating means for maintaining the thermal reservoir at a high temperature. Control means are provided for actuating the impingement-causing means and for actuating the heating means to preheat the thermal reservoir and the ambient air in the plenum prior to actuation of the impingement-causing means.

The oven is characterized by the capability of cooking and browning most frozen or refrigerated products placed in the cooking chamber within one minute when the thermal reservoir and the air in the plenum are preheated.

The present invention also encompasses an oven for cooking at least in part by hot air impingement cooking, comprising a housing defining a cooking chamber adapted to receive a food product for cooking, a hot air plenum configured and dimensioned to hold a volume of air, and means for selectively providing gaseous communication therebetween. The cooking chamber is configured and dimensioned to direct air from the plenum onto one surface of the product in the cooking chamber and reflect such air back onto and across a substantial portion of an opposed surface of the product. Also provided are actuatable means for causing impingement of air from the plenum onto the product in the cooking chamber, control means for actuating the impingement-causing means, and associated with the plenum a thermal reservoir and heating means for maintaining the thermal reservoir at a high temperature.

Preferably the cooking chamber is configured and dimensioned to direct air from the plenum onto at least one surface of the product in the cooking chamber (preferably also the sides of the product) and reflect such air back onto and across a substantial portion of a surface of the product opposed to such at least one surface. The cooking chamber includes means, such as a centrally apertured refractory disk, restricting the passage of air from the cooking chamber to the plenum until the air has passed along substantially a radius of the opposed surface of the product.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

While the present invention will be described in terms of a stand-alone quick-cooking oven such as might be found in a self-service retail environment (such as a convenience store), it will be obvious to those skilled in the vending machine art that an oven according to the present invention may easily be incorporated into a stand-alone vending machine, similar to a soft drink or cigarette vending machine, wherein the user selects and pays for a particular food item which is then dispensed in a conventional manner from a supply of such food items into the cooking chamber, quickly cooked according to directions appropriate for the selected food item, and then discharged from the cooking chamber and delivered to the purchaser, all without human intervention and using automatic vending machine techniques well known to those skilled in the vending machine art. Alternatively the quick-cooking oven may be adapted for use in a restaurant or like professionally serviced establishment.

Figure 1:
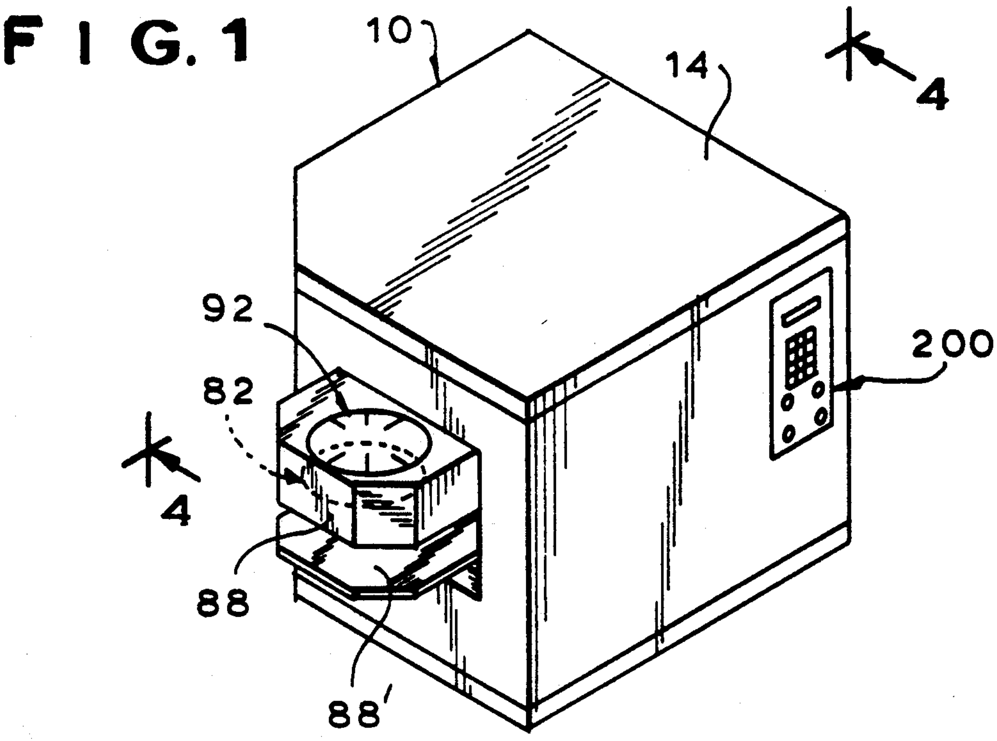
FIG. 1 is an isometric view of an oven according to the present invention.
Figure 3:
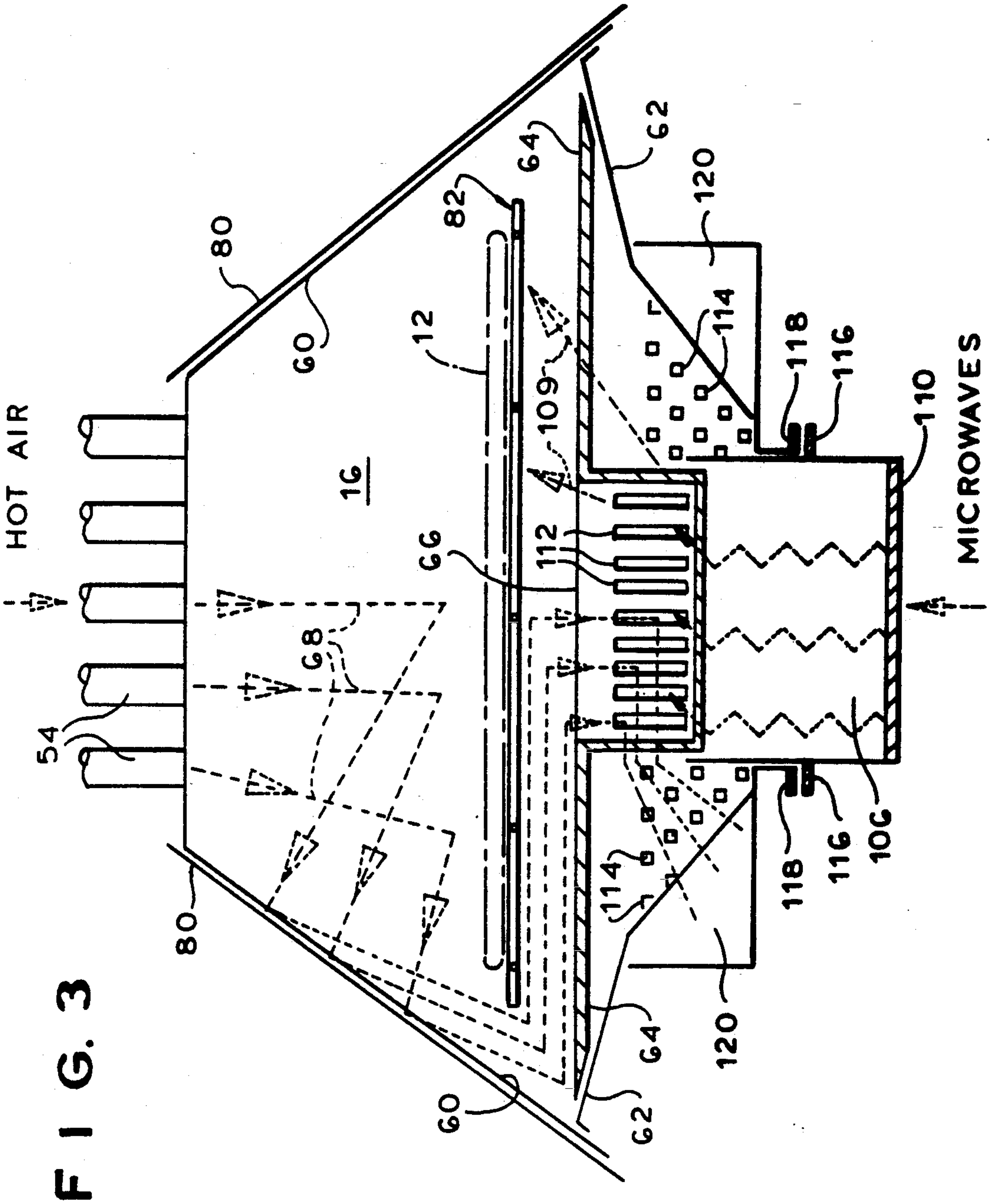
FIG. 3 is a fragmentary elevational view of the cooking chamber and its related environment illustrating, in broken line, the paths taken by the hot air and microwaves during use.
Figure 4:
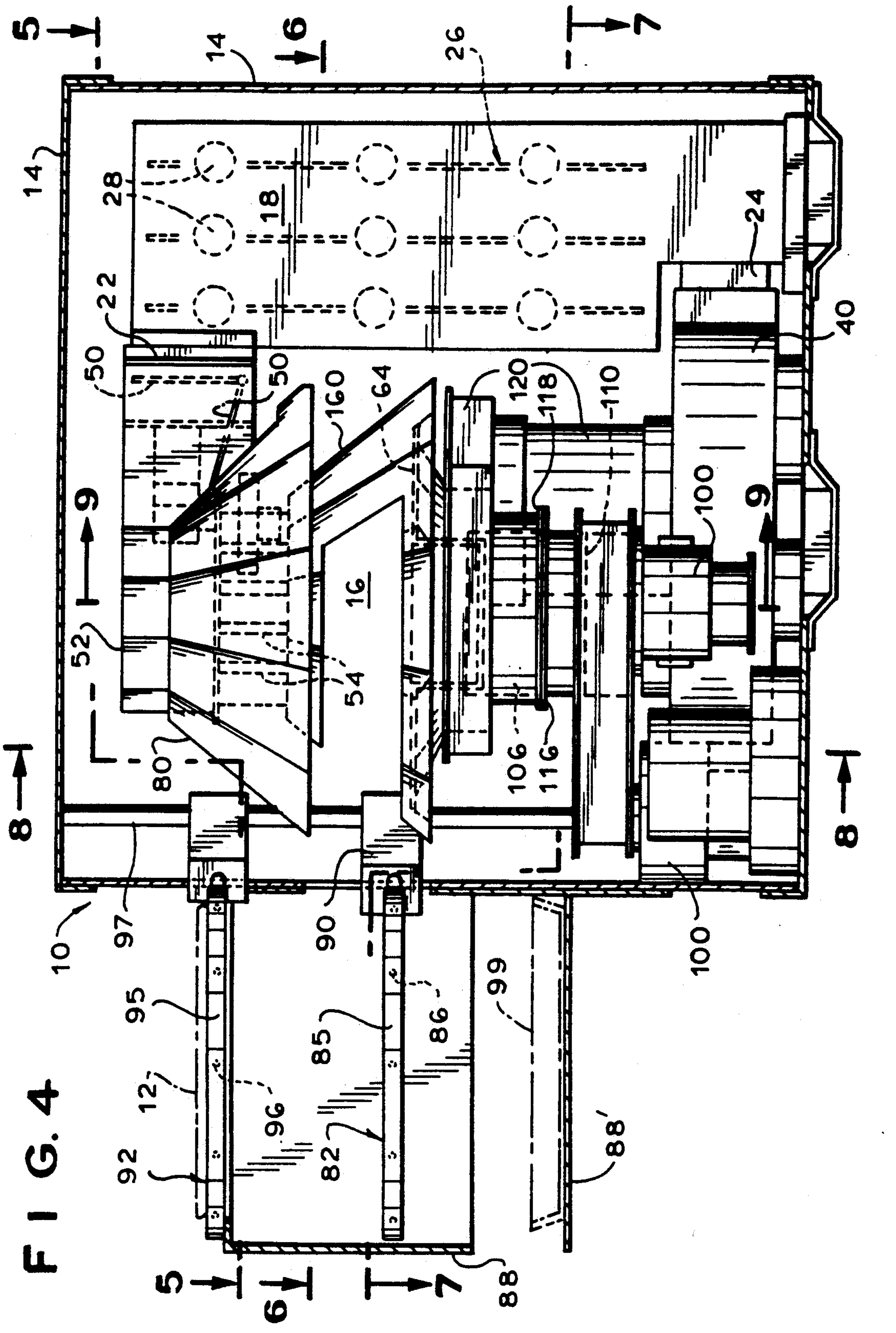
FIG. 4 is an elevational section view taken along the line 4—4 of FIG. 1.

Referring now to the drawing, and in particular to FIGS. 1 and 4 thereof, therein illustrated is a hybrid oven according to the present invention, generally designated by the reference numeral 10, for cooking a food product 12 (illustrated in FIG. 3 in phantom line) by both hot air impingement and microwave cooking. The oven 10 comprises a housing generally designated 14, defining a cooking chamber generally designated 16 and adapted to receive the food product 12 for cooking, a hot air plenum generally designated 18 and configured and dimensioned to hold a large quantity of air, and means generally designated for selectively providing gaseous communication between the cooking chamber 16 and the plenum 18. While the plenum 18 is illustrated as being positioned behind the cooking chamber 16, depending upon the desired configuration of the oven (which may be individualized to meet available space requirements), alternative dispositions of the plenum 18 relative to the cooking chamber 16 may be utilized. More particularly, the gaseous communication means includes both an ingress conduit 22 for the passage of hot air from the plenum 18 into the cooking chamber 16 and an egress conduit 24 for the passage of cooled air from the cooking chamber 16 into the plenum 18.

Figure 10:
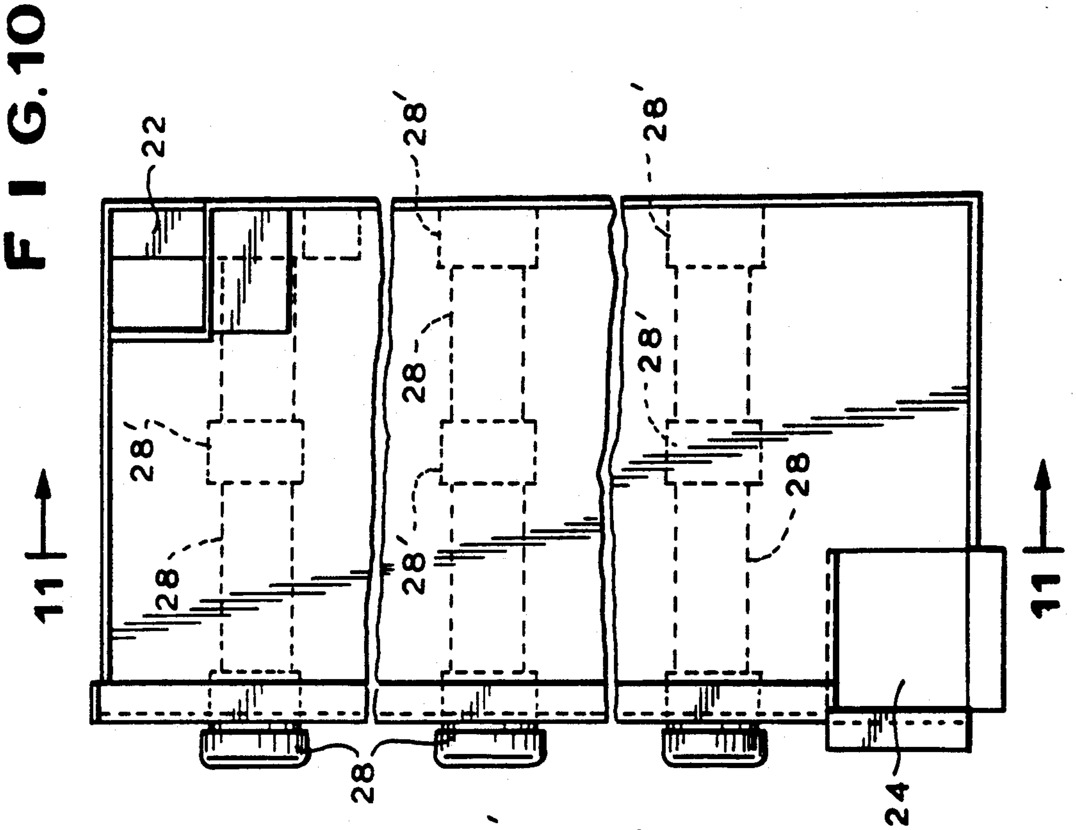
FIG. 10 is a front elevational view of the plenum alone.
Figure 11:
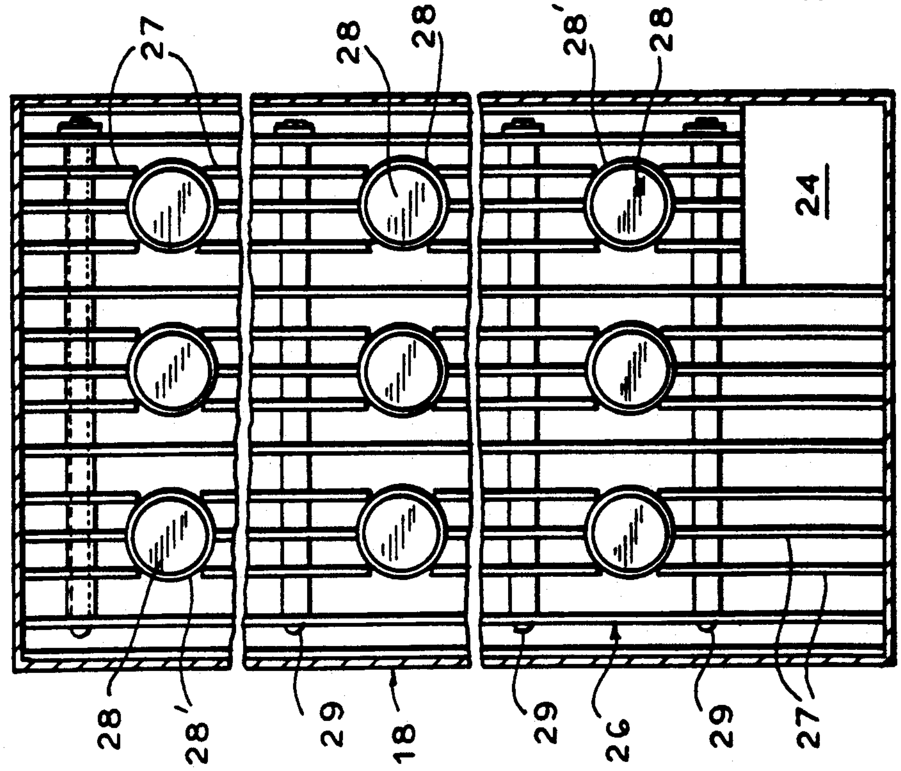
FIG. 11 is a section view thereof taken along the line 11—11 of FIG. 10.

Referring now to FIGS. 10 and 11 as well, the plenum 18 is at least equal in size to, and preferably larger than, the cooking chamber 16; preferably it is configured and dimensioned to hold at least about 1.5 cubic feet of air in addition to a thermal reservoir generally designated 26 and actuatable heating means 28 for maintaining the thermal reservoir 26 at a high temperature, both typically (but not necessarily) being disposed within the plenum. The thermal reservoir 26 is preferably at least 60 lbs. (excluding the plenum housing thereabout) of a metal, such as steel or copper, disposed in the configuration of a heat exchanger (that is, with a maximized surface area) so as to facilitate rapid heat transfer between the reservoir 26 and the ambient air within the plenum 18. The reservoir 26 functions as a heat sink or heat exchanger and, accordingly, may be suitably formed by a series of fins 27 or plates running parallel to one another and separated by spacers 29 to provide spaces of approximately 0.5 in. in order to facilitate the movement of air between and about the fins 27 and, thus, the transfer of heat from the reservoir 26 to the air. The heat transfer is maximized by providing a high ratio of the surface area of the heat reservoir to the volume of air within the plenum 18.

The composition and dimensions of the thermal reservoir 26 are selected to provide both a high specific heat and a high heat capacity relative to the air disposed in the plenum 18. The high specific heat ensures that a unit mass of the thermal reservoir can surrender sufficient heat to warm up a high number of unit masses of the air disposed in the plenum, and the high heat capacity ensures that the total heat stored within the thermal reservoir is capable of heating a large mass of air disposed in the plenum without itself becoming unduly cooled. The reservoir 26 must be formed of a material which can sustain the desired high temperatures over an extended period of time without adverse effects on the material from which it is formed, copper and steel being among those preferred for these purposes.

The selected material must also be able to withstand thermal cycling from ambient temperatures to as high as, preferably, at least 700° F., although it will be appreciated that according to the present invention such thermal cycling may be severely limited, as the thermal reservoir will typically be allowed to cool from its elevated preheat temperature to room temperature at most once a day (at the end of the work day) and, indeed, is preferably maintained constantly at an elevated preheat temperature ready for use at all times (much like a refrigerator is maintained constantly at a depressed cooling temperature). Accordingly, the metal used in the reservoir 26 has a long operative life since it is not cycled from cold (ambient temperature) to hot each time food is placed in the cooking chamber, but preferably stays hot once preheated. The reservoir 26 will, of course, be periodically re-heated as necessary to maintain it at the desired temperature, preferably between cooks, so that the power required to drive the cook features (i.e., the magnetrons and hot air blower) is not in use at the same time as the power to heat the reservoir.

For an oven 10 having dimensions of 24″×24″×24″, the plenum 18 may have the dimensions of 22″×20″×8″ for a total capacity of about two cubic feet (about 1.5 cubic feet of that being available for air), and the cooking chamber 16 may have the dimensions of a cylinder 14″ in diameter 8″ tall for a total capacity of about 0.75 cubic feet, for cooking of a food product 12 having a maximum 12″ diameter and a maximum 3.0″ height. The volume of the plenum 18 is large relative to the volume of the cooking chamber 16 to ensure that there will be a sufficient quantity of preheated air within the plenum 18 so that, even when it mixes with the initially cool air within the cooking chamber 16, it is sufficient to rapidly bring the air in the cooking chamber 16 to desired operating levels. Preferably the plenum volume available for air (that is, excluding the reservoir 26 and heater 28) exceeds the cooking chamber volume and ideally is at least twice the latter.

The heating means 28 is selected to enable the reservoir 26 and the air within the plenum 18 to be heated to and maintained at an elevated temperature, preferably at least 700° F., so that the plenum 18 acts as a kiln which, when once preheated, provides hot air to the cooking chamber 16 on demand, without any warm-up period, thereby rendering the preheated oven 10 immediately ready to cook with both hot air impingement and microwaves. The heating means 28 may be a conventional heating coil—such as wire wrapped around a cylindrical ceramic rod—which, when electrically energized, over a prolonged period of time (typically as much as one to two hours) is sufficient to bring the reservoir 26 and the ambient air within the plenum 18 to the desired operating temperature. The cylindrical ceramic rods of heating means 28 are typically horizontally disposed, while the fins or plates 27 of thermal reservoir 26 are typically vertically disposed to minimize interference with the circulation of air within the plenum and intermittently secured to electrical insulation 28′ about coils 28.

Since the preheat will typically occur only once or daily, a slow preheat taking at least an hour and as much as two hours, but using only a 110 volt power supply is preferred. However more powerful heating elements may be used to reduce the start-up time required for the preheat where 220 volt or larger power supplies are available, such as in restaurants. Operation of the heating means 28 may be controlled by the control means 250 to be discussed hereinafter, including a thermostat and a cut-off switch which cuts off power to the heating means 28 either when the power supply is being used for the magnetrons or hot air blower and there is insufficient power supply to enable the magnetrons, hot air blower and the heating means 28 to be simultaneously operated or when the actual temperature of the plenum exceeds a "set" temperature.

Figure 5:
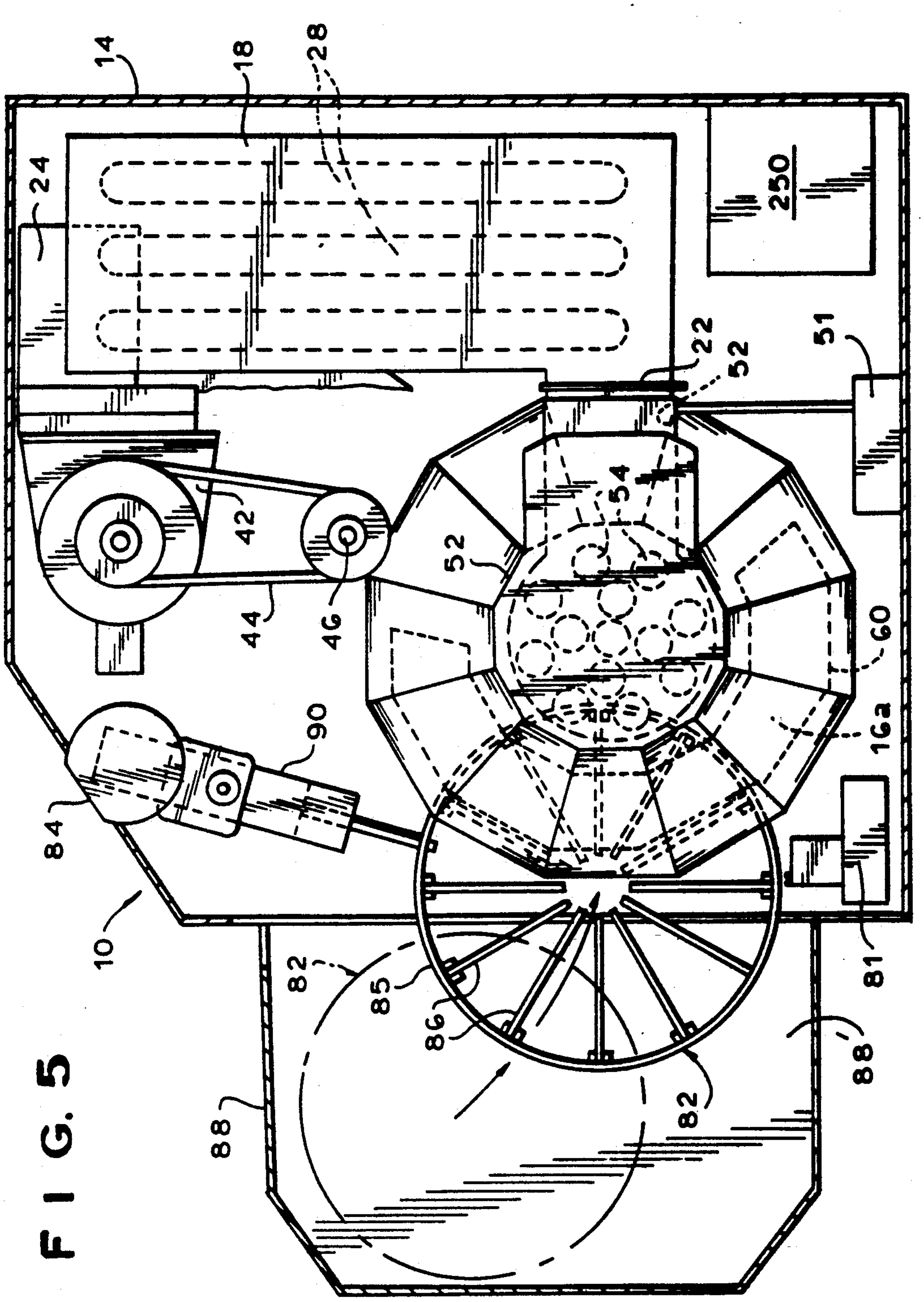
FIGS. 5, 6 and 7 are plan section views taken along the lines 5—5, 6—6 and 7—7, respectively, of FIG. 4.
Figure 8:
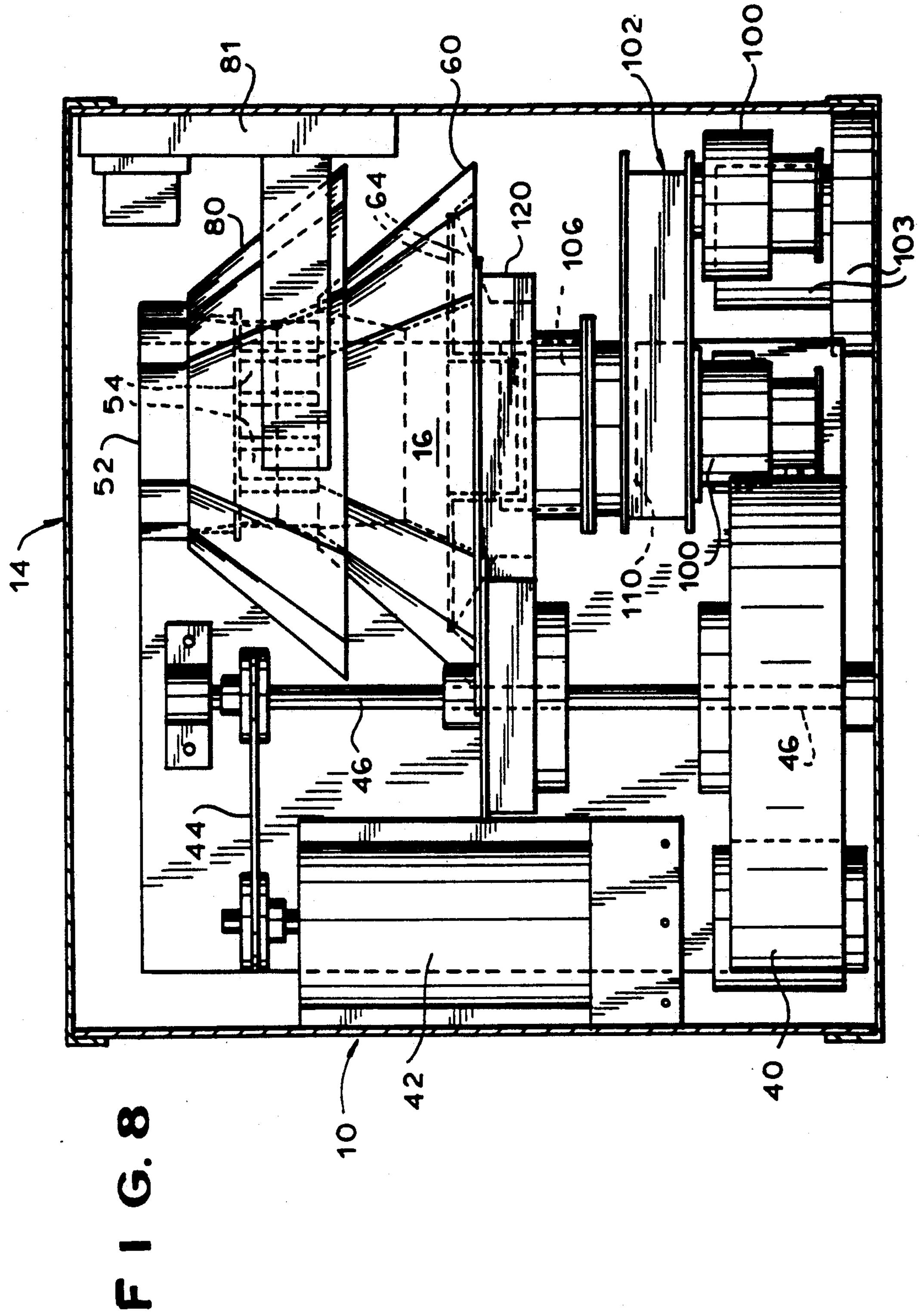
FIG. 8 is a elevational section view taken along the line 8—8 of FIG. 4.

Referring now to FIGS. 4–5 and 8, a hot air blower 40 is provided to circulate the air in the closed air system between the plenum 18 and the cooking chamber 16 and provide the hot air impingement function. The blower 40 is driven by a blower motor 42 connected by a flexible belt 44 to a blower shaft 46. A belt linkage is preferable to a hard or direct linkage in order to minimize heat transfer from the blower 40 to the blower motor 42, which heat transfer might result in overheating of the blower motor 42. The blower motor 42 preferably operates on a 110 volt power supply, although a 220 volt power supply may be used, depending upon the availability of the 220 volt power supply and the size of the blower. For a 24″×24″×24″ oven, a blower having a capacity of 610 cu. ft./min. (4 inch water head) is suitable.

Figure 6:
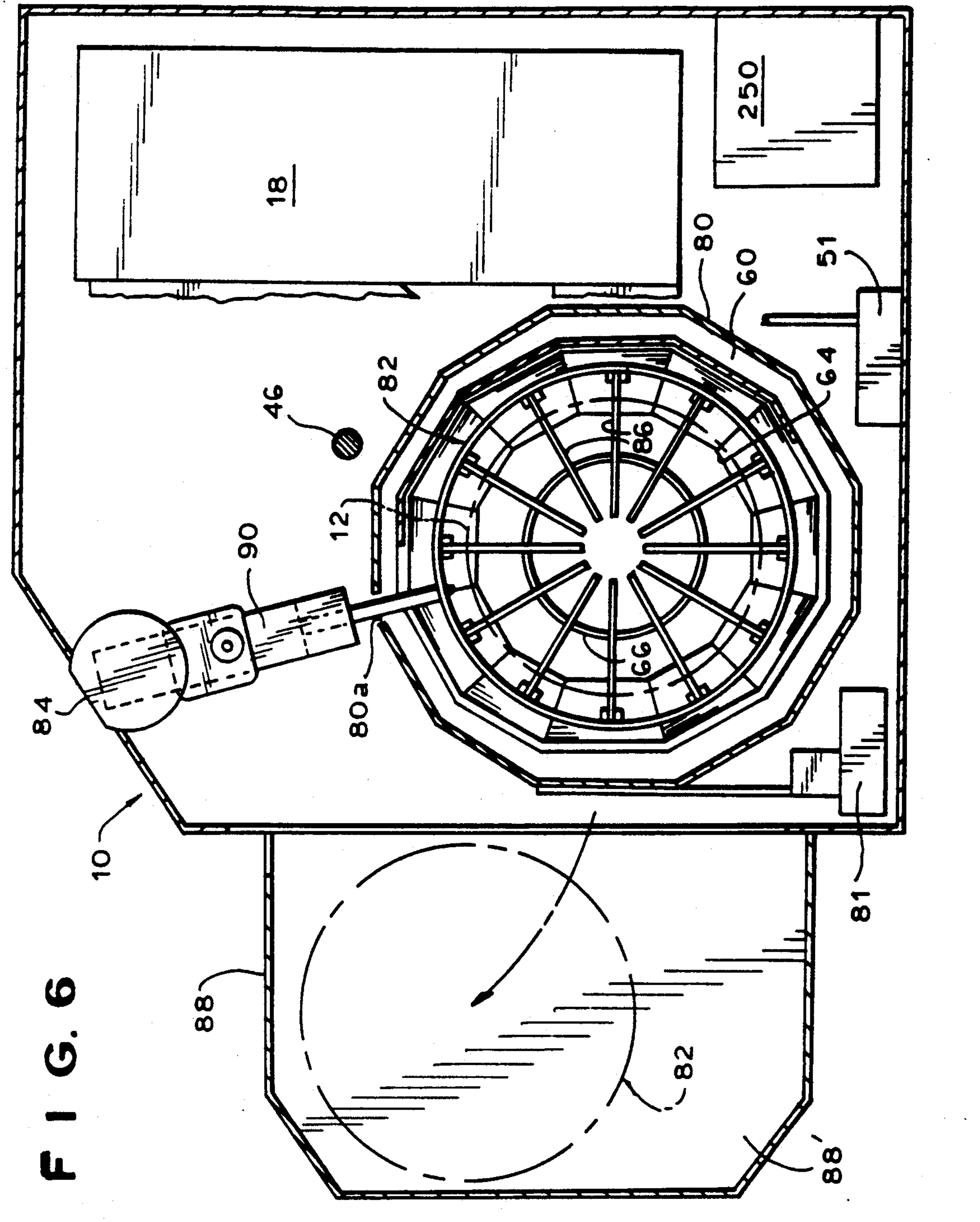

The blower 40 takes the spent hot air from the cooking chamber 16 and blows it through the egress 24 into the plenum 18 for reheating and recirculation. Referring now to FIG. 4, when the blower 40 is operating, a damper 50 positioned adjacent the ingress 22 is in an open orientation (illustrated in phantom line) enabling the passage of air from the plenum 18 into the cooking chamber 16. When the blower 40 is not operating, the damper 50 is in a closed orientation (illustrated in solid line) precluding the passage of air from the plenum 18 into the cooking chamber 16. (As a safety precaution, the damper 50 may be operatively connected to the cooking chamber shroud 80 so that the damper 50 can be moved to its open orientation only when the shroud 80 is closed, thus precluding the unintentional escape of heat from the oven through the cooking chamber opening). The damper 50 is moved between its extreme orientations by a damper motor 51 (see FIGS. 5 and 6). The hot air passing through the ingress 22 is communicated by a hot-air duct 52 into generally vertically disposed impingement tube 54 which feed into the cooking chamber 16, closely adjacent the upper surface of the food product 12 therein.

The principles of operation of hot-air impingement cooking are well known in the art and hence need not be described herein in detail. It will be appreciated, however, that the hot air is blown through the constricted impingement tubes 54 by the blower 40 with sufficient pressure that the hot air effectively drives away the typical boundary of cool air adjacent the food product (especially where the food product is initially frozen) and optimally continually wipes away the moisture which forms at the surface of the food product, thereby enabling rapid browning or toasting of the food product by the hot air. Where the food product 12 is sufficiently small in diameter (or, if not circular, in length and width) relative to the array of impingement tubes 54, the hot-air impingement effect is obtained not only on the upper surface of the food product 12 (that is, the surface facing the impingement tubes 54), but also on the sides of the food product 12.

However, there is a well known problem with hot-air impingement cooking, in that only the surfaces directly exposed to the hot-air impingement tubes are rapidly cooked, and the remaining surfaces (the opposite surface and possibly the sides as well) are not cooked as rapidly. Such a problem can be severe where the food product 12 is particularly thick or where the non-directly exposed surface of the food product requires substantially the same or more heat than the directly exposed surface of the food product (for example, where a pizza with a thick crust requires substantial cooking of the crust, but can tolerate only lesser cooking of the toppings, which will dry out or scorch if overcooked). The present invention minimizes or completely avoids this problem while directing air against the product from only one side thereof, that is, the side of the impingement tubes 54.

Referring now to FIG. 3 in particular, the cooking chamber 16 is configured and dimensioned to direct air from the plenum 18 and impingement tubes 54 onto at least a first surface of the food product 12 (here, the top surface) and then reflect the air back onto and across a substantial portion of a second surface of the food product 12 (here, the bottom surface) opposed to such first surface. The outwardly and downwardly angled configuration of the cooking chamber 14 above the level of the food product 12 increases the microwave cooking efficiency by reducing standing waves which typically occur within a rectangular or cylindrical cooking chamber and increases the hot air cooking efficiency (i.e., the heat transfer from the impinging hot air to the food product) by minimizing the dead-air zones which typically occur within a rectangular or cylindrical cooking chamber. A refractory disk 64 of microwave-transparent and heat-resistant material (such as a ceramic) defines a central aperture 66 and is disposed in close but spaced relationship to the second surface of the food product 12 (here, the bottom surface) so that the reflected air is forced to pass over the sides and substantially the entire radius of the product bottom surface before the air reaches the central aperture 66 of the ceramic disk 64 and is eventually lead into the plenum 18 by the return air duct 120 and blower 40 for reheating and recirculating.

More particularly, the cooking chamber 16, which may be round or polygonal (e.g., 12 sided) in cross-section, has an upper sidewall 60 and a lower sidewall 62, the upper and lower sidewalls 60, 62 joining to define an acute angle (preferably about 60°) at a point intermediate the lower surface of the food product 12 and the upper surface of the ceramic disk 64. Alternatively the upper and lower sidewalls 60, 62 may define a single outwardly bowed sidewall. As the ceramic disk 64 extends essentially the full diameter of the plane of the cooking chamber 16 in which it is disposed, central aperture 66 thereof is the only passage through which the spent air can escape the cooking chamber 16 and pass back to the plenum 18, and then only after passing across a substantial portion of the food product 12 in the chamber 16. The exact portion is almost always greater than 50% of the bottom surface area of the food product 12, and preferably greater than 75%, depending upon the relative sizes of the central aperture 66 and the bottom surface of the food product 12.

As illustrated by the broken line arrows 68 on the left of FIG. 3, the hot air leaving the impingement tubes 54 strikes the upper surface of the food stuff 12 and is reflected upwardly to the upper sidewall 60 and thence downwardly towards the lower sidewall 62. The upper surface of the ceramic disk 64 intercepts the hot air reflected downwardly by the upper sidewall 60 and prevents it from leaving the cooking chamber 16 until it has passed radially inwardly, intermediate the bottom surface of the food product 12 and the upper surface of the ceramic disk 64, until it reaches the central aperture 66. During its entire passage along the bottom surface of the food product 12, the hot air is cooking the bottom surface of the food product 12, thus providing an enhanced cooking of that bottom surface. The air passing through the central aperture 66 of ceramic disk 64 is eventually returned to the blower 40 via various return air slots 112 and return air holes 114, which will be described hereinafter, and then from the blower 40 through the egress 24 into plenum 18 for reheating and recirculation. The central aperture 66, the return air slats 112 and the return air holes 114 are desirably large enough to preclude an airflow bottleneck from developing.

As best seen in FIG. 3, the ceramic disk 64 has the configuration of an inverted hat with the brim extending parallel to the cooking tray 82 which supports the food product 12 and a downwardly extending crown being disposed in the circular waveguide 106 within return air duct 120 and defining the return air slots 112 communicating with the air holes 114 of the return air duct 120 leading to blower 40. Preferably the ceramic disk 64 is easily removable and replaceable in the oven 10, simply by removing ledge 88 (which easily lifts up and out, off housing 14), raising the shroud 80, moving the cooking tray 82 out of the way, lifting the ceramic disk 64 (so that the crown thereof is above the cylindrical waveguide 106) and then moving it laterally through the opening 16*a* (see FIG. 5) of the cooking chamber 16. This permits the debris, juices and the like which drop from the food product 12 during cooking thereof and fall onto the ceramic disk 64 to be easily removed therefrom externally of the oven 10.

Figure 9:
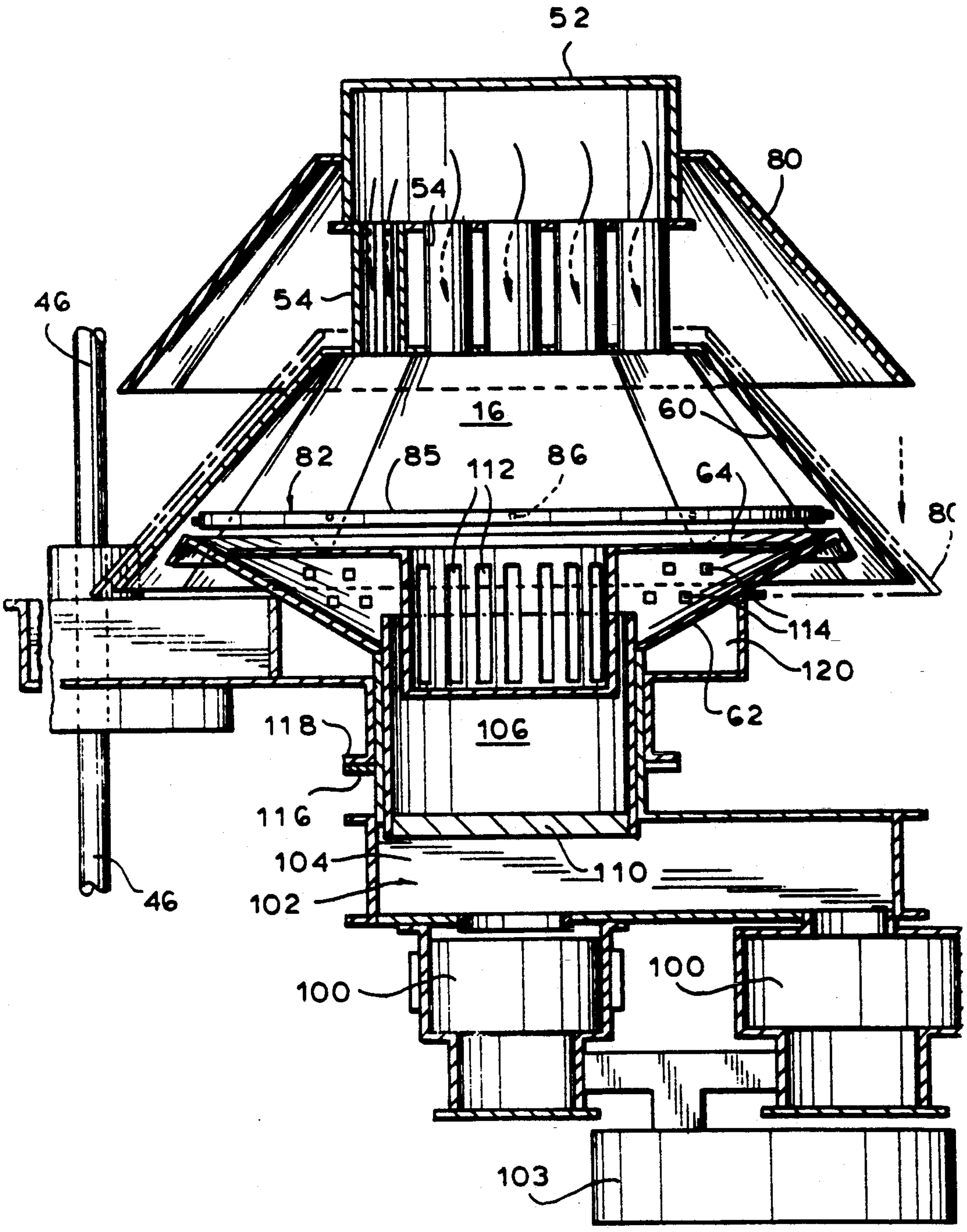
FIG. 9 is a fragmentary elevational section view taken along the line 9—9 of FIG. 4.

Those skilled in the oven art will readily appreciate that, where appropriate for the particular food products 12 to be cooked, the entire operative configuration of the oven 10 can be inverted so that the hot-air impingement tubes 54 are disposed below the food product 12, so as to directly force the hot air against the bottom of the food product 12, and the ceramic disk 64 is disposed above the top of the food product 12, so as to force the reflected air to travel across a radius of the upper surface of the food product 12. Indeed, in those particular instances where it is desirable to maximize cooking of one surface at the expense of the other surface, the surface to be highly cooked may be disposed directly opposite the impingement tubes 54, and the ceramic disk 64 eliminated so that the other surface is only lightly cooked. It should also be understood that the number of impingement tubes 54 illustrated is only representative so that more or fewer impingement tubes 54 may be used, and that the vertical spacings of the impingement tubes 54 and the ceramic disk 64 from the adjacent surfaces of the food product 12 (e.g., about 4 inches and about 1 inch, respectively) have not been illustrated to scale as the actual spacings will depend on the particular intended applications of the oven.

Where there will be a plurality of ovens according to the present invention in close proximity to one another, as might be the case in a restaurant, economies can be achieved by providing the various ovens with a common plenum which is interconnected with the cooking chambers of the various ovens so as to provide them with hot air for impingement cooking. The common plenum would, of course, be oversized relative to the plenum 18 of a single oven 10, as would the thermal reservoirs 26 and heating means 28 thereof. But, since the demands placed upon the common plenum 18 by the various individual cooking chambers will presumably average out over time, the common plenum is less likely to be subject to extremely high demands for hot air at any given time and thus can have less "reserve" heating capacity than would be true of a single plenum dedicated to a single cooking chamber In order to minimize the escape of heat from the interior of the cooking chamber 16 through the front opening 16*a* thereof during cooking and any time access thereto is not required, the cooking chamber 16 is provided with a cooking chamber shroud 80 (shaped like an inverted bowl) which in its lowered position (illustrated in FIGS. 3, 6 and 9, the latter in phantom line) covers the top and sides of cooking chamber 16 to close the opening 16*a* thereof, like a door, to preclude the escape of heat therethrough, and in its raised position (illustrated in FIGS. 4–5, 8 and 9, the latter in solid line) exposes the opening thereof to enable the food product 12 to be inserted into or removed from the cooking chamber 16. The shroud 80 provides an aperture or recess 80*a* therethrough (see FIG. 6) for passage of arm 90 connecting the cooking tray 82 and the pivot mechanism 84 therefor. A shroud raising/lowering mechanism 81 (see FIGS. 5–6 and 8) is controlled by control means 250 to move the shroud 80 between its two positions.

In order to enable the food stuff 12 to be easily, safely and rapidly placed in the cooking chamber 16, the oven 10 is preferably provided with a cooking tray, generally designated 82, which is pivotably mounted by a pivot mechanism 84 within the interior of housing 14 so that it can be swung from a loading/unloading position in a ledge 88 totally outside the oven proper (as illustrated in FIGS. 1 and 4), through an intermediate position (illustrated in FIG. 5) once the shroud 80 has been opened (i.e., raised), into a cooking position (illustrated in FIG. 6) wherein it is totally within the cooking chamber 16 and the shroud may then be closed (i.e., lowered).

The cooking tray 82 is preferably in the form of a spoked wheel, with the spokes made of refractory material. Thus the cooking tray 82 is preferably comprised of a metal ring or wheel 85 provided with a plurality of radial ceramic spokes 86. The cooking tray 82 supports the food product 12 when in either of the extreme positions and during movement therebetween, while at the same time presenting a minimal interference with the microexposure of the bottom surface of the food product 12 to the hot air traveling between the bottom of the food product 12 and the top of the ceramic disk 64. The spokes 86 are pivotable between generally flat and generally vertical orientations, with the spokes 86 receiving and supporting the food product 12 when they are in the horizontal orientation and permitting the cooked food product to be delivered (i.e., dropped) onto a plate 99 placed on ledge 88' when the spokes 86 are lowered to the vertical orientation. When the spokes 86 are in the horizontal orientation within the cooking chamber 16, they also act as baffles to direct air across the bottom surface of the food product 12.

When the cooking tray 82 is disposed outside of the cooking chamber 16, it is positioned within a ledge 88 extending outwardly from housing 14 and cannot be touched accidentally by a user (although for maintenance and cleaning purposes the entire ledge 88 may be easily removed). The arm 90 connecting the cooking tray pivot mechanism 84 and the cooking tray 82 may be telescopic in nature or of fixed length, as preferred for a particular configuration of the oven, and may contain the mechanism (responsive to control means 250) for pivoting the spokes 86 of the cooking tray 82.

Figure 4A:
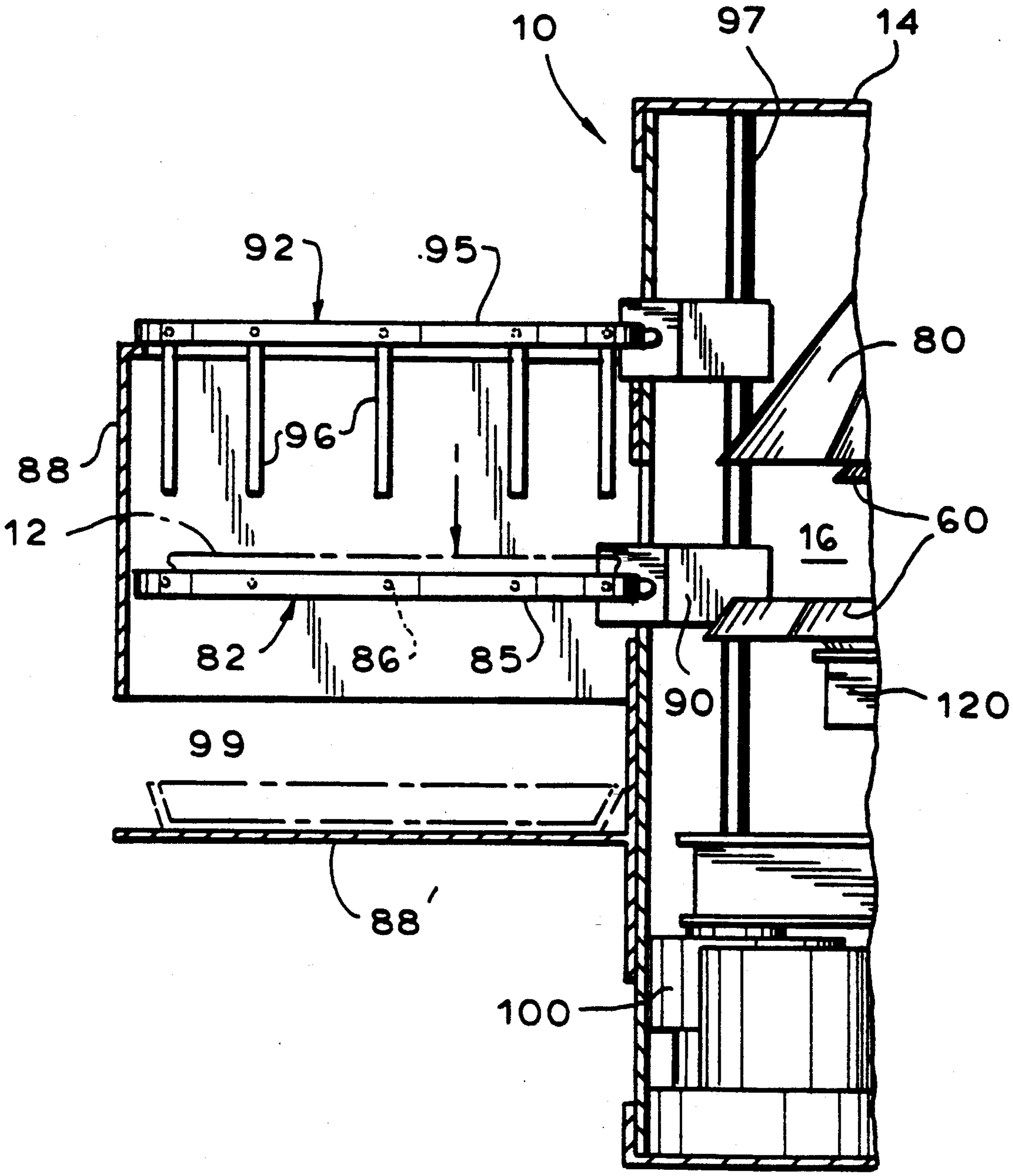
FIGS. 4A and 4B are enlarged fragmentary views of the loading/unloading mechanism, illustrating loading and unloading, respectively.
Figure 4B:
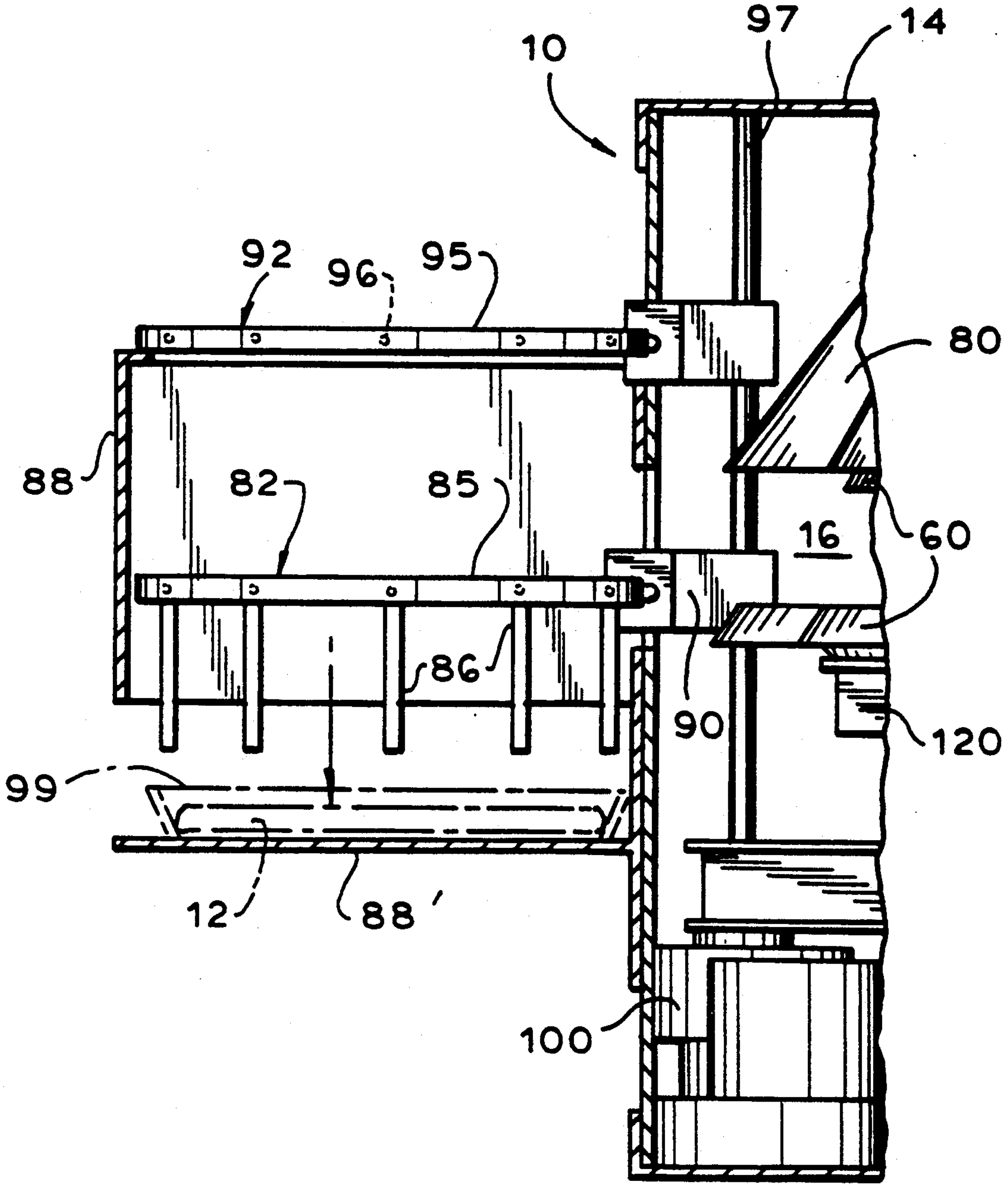

Referring now to FIGS. 1 and 4A, a loading tray 92 is disposed over a large central aperture in the upper surface of the ledge 88 extending outward of housing 14. The loading tray 92 is similar to cooking tray 82 in configuration and dimensions and includes a ring or hollow wheel 95 and spokes 96, but (unlike cooking tray 82) cannot pivot into the oven housing 14. The customer places the food product to be cooked on the loading tray 92 which supports the food product 12. When the cooking process is to commence, e.g., the START button 206 (see FIG. 2) is pressed, the spokes of the loading tray 92 are pivoted downwardly by control means 250, thereby permitting the food product 12 to drop onto the cooking tray 82. As described above, the cooking tray 82 is then pivoted inwardly into the cooking chamber 16, the food product 12 is cooked, and then the cooking tray 82 is pivoted outwardly, back into the ledge 88. Referring now to FIG. 4B, the spokes 86 of the cooking tray 82 are then pivoted downwardly, and the cooked food product 12 delivered to (i.e., dropped onto) a plate 99 Previously placed on a second ledge 88' below ledge 88.

As best seen in FIG. 4, both cooking tray 82 (via arm 90 and pivot mechanism 84) and loading tray 92 are supported by a common generally cylindrical mounting post 97 secured to housing 14.

As the present invention pertains specifically to the oven 10, a rather simple food delivery system has been disclosed for use in connection therewith. It will be appreciated, however, by those skilled in the vending machine art, that in a fully automated vending machine utilizing such an oven 10, means may be provided for dispensing a food product 12 from a supply of food products directly onto the top of the tray 82 and for dispensing the cooked food product 12 from the cooking tray 82 to the customer. Furthermore, small food products such as French fries may be contained within a heat-resistant and microwave-transparent cooking vessel so that they do not fall between the spokes 86, 96.

Turning now to the microwave-cooking feature of the present invention, microwave ovens are well known in the art and hence need not be described in great detail herein. Referring now in particular to FIGS. 4 and 7–9, a pair of magnetrons 100 are disposed so that the microwave output therefrom is discharged into the legs of an angled, common waveguide generally designated 102. The impedances of the two magnetrons 100 are deliberately mismatched to preclude the output of one magnetron 100 being communicated to the other magnetron 100. While the magnetrons 100 are preferably operable on a 110 volt power supply, where a 220 or higher voltage supply is available (such as in a restaurant or commercial establishment), a higher voltage power supply may be used and, indeed, the two magnetrons may even be replaced by a single, large magnetron thereby eliminating the need for an angled waveguide intermediate the circular waveguide and the magnetrons. A magnetron cooling means 103, such as a blower, provides cooling air to the magnetrons 100 via cool air ducts.

Figure 7:
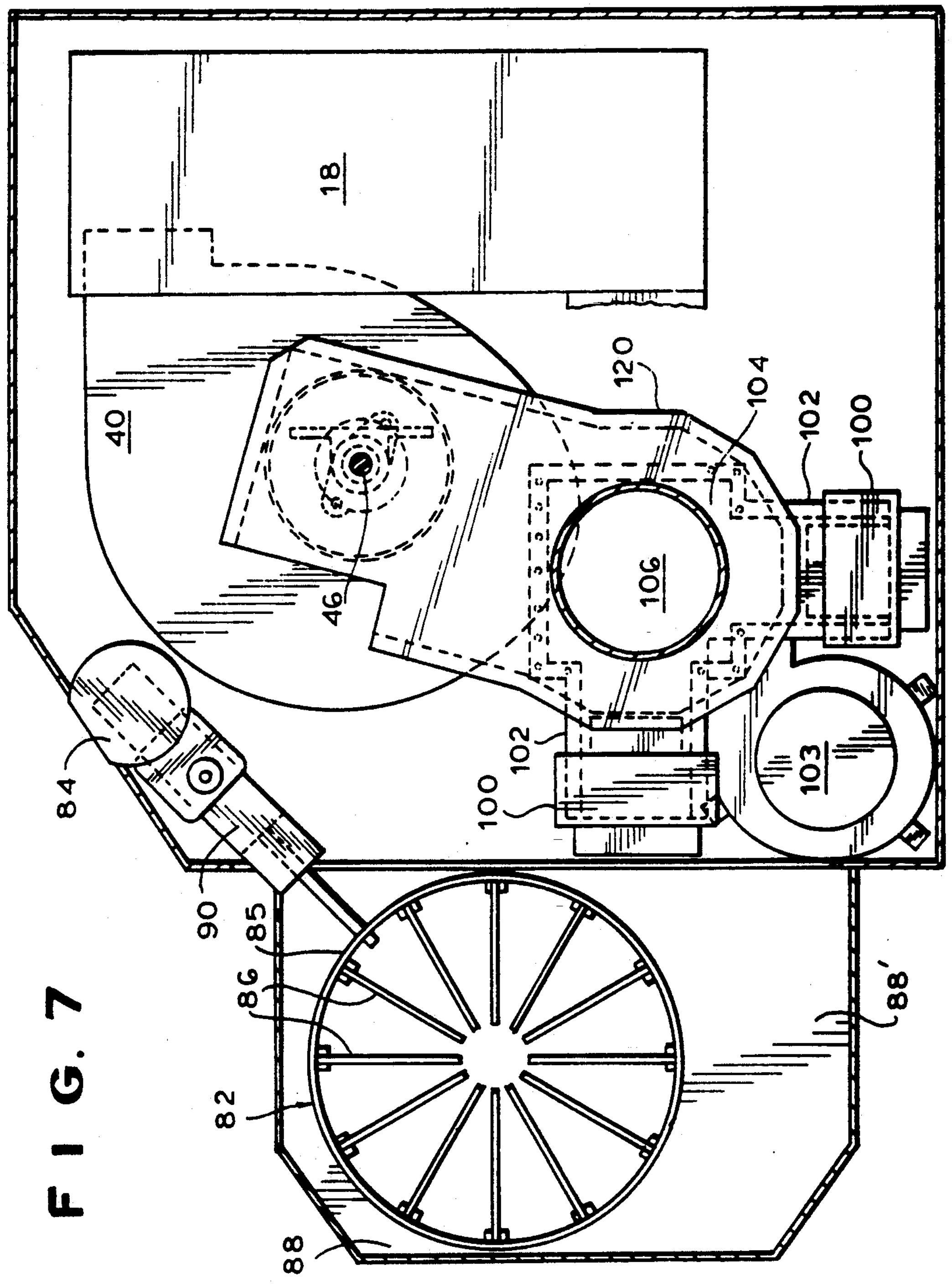

As best seen in FIG. 7, the common waveguide 102 preferably has the configuration of a right angle, with each leg constituting a rectangular waveguide and the apex or junction acting as a coupler, permitting the microwaves from each leg or rectangular waveguide of the angled waveguide 102 to be fed into a circular waveguide 106 thereabove. The common waveguide 102 and the circular waveguide 106 are welded together to preclude arcing therebetween or any escape of the microwaves from therebetween. The circular waveguide 106 in turn discharges the microwaves fed thereinto upwardly towards the cooking tray 82 and the food product 12, as illustrated by the broken line arrows 109 on the right of FIG. 3.

More particularly, at the base of the circular waveguide 106, where it is connected to magnetrons 100 by the coupler 104 and the rectangular waveguide legs of the angled waveguide 102, a heat seal 110 is provided so that the hot air from the cooking chamber 106 cannot approach any further the relatively delicate magnetrons 100. The heat seal or barrier 110 is formed of a microwave-transparent and heat-resistant material, such as a ceramic. In a preferred embodiment of the present invention, at the place of manufacture the microwave generation and transmission apparatus—including the magnetrons 100, common waveguide 102, heat barrier 110 and circular waveguide 106—may be moved vertically upwardly and downwardly relative to the cooking tray 82 so as to focus the microwaves on a hypothetical food product on cooking tray 82. To preclude the escape of microwaves from the intersection between the microwave generation and transmission apparatus described above and the return air duct 120 through which the circular waveguide 106 extends, each is provided with a microwave seal 116, 118 in the form of a metal plate of about 5-6 inches extending thereabout. The microwave seal 116 of the microwave generation and transmission apparatus is movable therewith to approach or retreat from the stationary microwave seal 118 of the return air duct 120.

Figure 2:
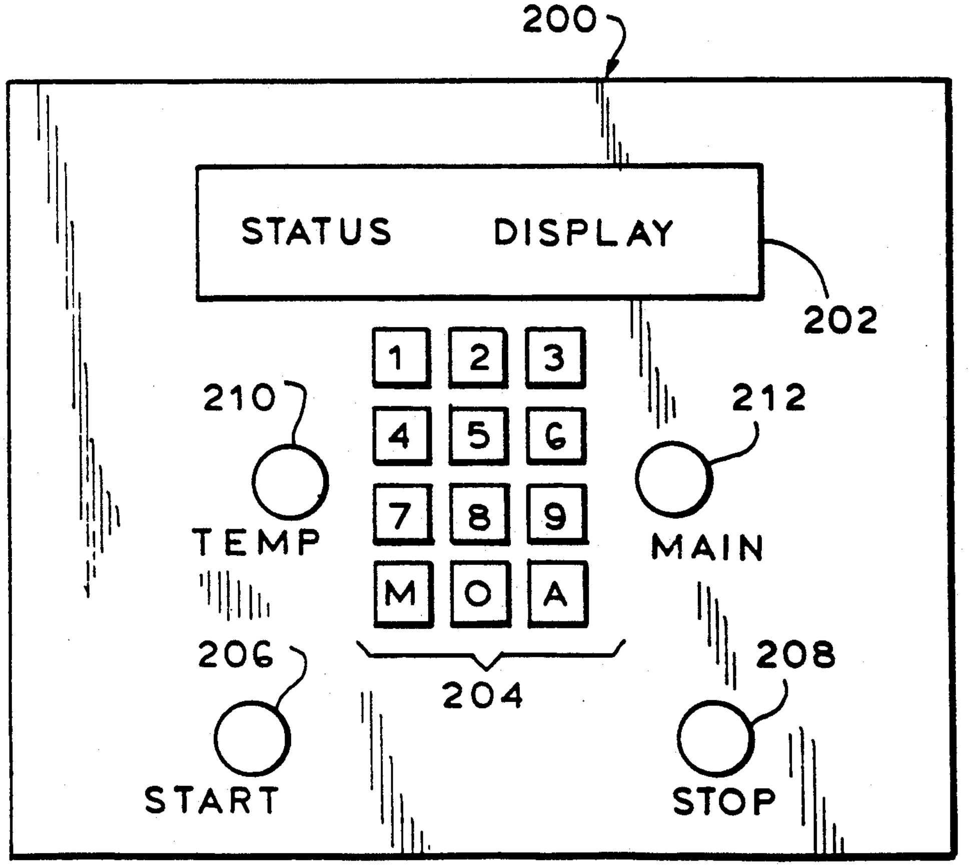
FIG. 2 is a front elevation view of the control panel thereof.

Referring now to FIG. 2, therein illustrated is the oven control panel generally designated 200 and including a status display 202 such as an LED panel, a data entry system 204 similar to a standard telephone keypad, but with the star and pound symbols being replaced by the symbols "M" and "A," respectively, and four button switches 206, 208, 210, 212 labeled "START," "STOP," "TEMP," and "MAIN," respectively.

The status display 202 displays the data being entered into the system through the keys 204, informational messages to the user, and the current function of the machine. The keypad 204 includes ten digital or numeric keys which function as numbers.

The M (microwave time mode) key of keypad 204 causes the display 202 to request entry of the microwave duration time, which the user can then enter (up to 99 seconds) using the digital or numeric keys, before exiting this mode by again pressing the M key (or by entering the wrong information on the key pad). The A (hot-air-time mode) key of keypad 204 causes the display 202 to request entry of the hot air impingement duration time, which the user can then enter (up to 99 seconds) using the digital keys, before exiting this mode by again pressing the A key (or by entering the wrong information on the keypad). Thus the M and A keys act as shift keys to cause the control panel to enter a specific mode for the entry of numeric data from the digital keys of keypad 204.

The START and STOP button switches 206, 208 are function keys that do not require any other input. The START button 206 initiates the cooking cycle and uses either the entered or default microwave and hot air impingement duration times. The default hot air time is 30 seconds, and the default microwave time is 30 seconds. The STOP button 208 stops the cooking cycle and can be used as an alternative to the cycle time simply counting down to zero.

The remaining TEMP and MAIN button switches 210, 212 work as shift keys to cause the control panel to enter a specific mode. Actuation of the TEMP (temperature) button 210 causes the control panel to enter the temperature-enter mode, with the display 202 showing the "oven temperature" (that is, the actual oven temperature in the cooking chamber) on the first line and the "set temperature" (that is, the temperature which has been set by the user) on the second line. The set temperature initially shown is the temperature that was last entered by the user, or by default 650° F., but the user can enter any temperature from 0° F. to 999° F. using the digital keys of data entry means 204 (preferably no higher than 800° F.). The user exits the temperature-enter mode by again pressing the TEMP button 210 or by entering the wrong information on the keypad. Actuation of the MAIN (maintenance) button 212 causes the control panel to enter the maintenance mode, with the display 202 indicating that the oven is in the "maintenance mode. " The keys 204 now are in a shift mode and are redefined to perform various diagnostic and related functions useful for maintenance, shipping and the like.

Control means 250 (see FIGS. 5 and 6), associated with the control panel 200, provides means for actuating the microwave cooking means (that is, the magnetrons 100) and the impingement-causing means (that is, the blower 40) in timed relation to one another. Depending upon the preferred cooking cycle for the food, the impingement-causing means and the microwave cooking means may be actuated substantially simultaneously. However, since the actuation of the blower 40 at the same instant as the actuation of the magnetrons 100 may result in a power fluctuation and activate the various safety mechanisms desirably provided to detect such power fluctuations, it is preferred that the blowers 40 be actuated at least about two seconds prior to actuation of the magnetrons 100. For particular food products, both microwave and hot-air-impingement cooking may proceed for the same period of time, or one or the other cooking function may commence before and/or terminate after the other cooking function. For example, certain foods (e.g., unfrozen foods) may require a relatively short microwave cooking period relative to a hot-air impingement cooking period so that the hot-air impingement cooking period may commence prior to actuation of the microwave cooking and continue after deactuation of the microwave cooking. Typically both functions are active concurrently for at least a period of time.

The controls means 250 may cause the heating means 28 to Preheat the thermal reservoir 26 and the ambient air in the plenum 18 at a time prior to actuation of impingement-causing means 40 (and preferably prior to actuation of microwave-cooking means 100 and impingement-causing means 40) which is substantially greater than the cooking time required for the food product 12. Depending upon such factors as the size of the plenum 18, the power supply used by the heating means 28, the desired temperature of the ambient air within the plenum, and the like, the oven 10 is preheated—that is, the heating means 28 are actuated—a substantial period of time prior to the oven actually being used for cooking. Where only a 110 power supply is available to the heating means 28, typically the preheating period is about 1-2 hours prior to use of the oven. Initiation of the preheat may be performed by a timer so that the preheat of the oven 10 is accomplished before personnel arrive to use the oven. Most typically, however, like a refrigerator, the oven 10 will be maintained ready for use (i.e., preheated) at all times.

Because the thermal reservoir 26 is of high specific heat and high heat capacity relative to the air disposed in the plenum, the temperature within the thermal reservoir tends to remain fairly constant despite repeated usage of the oven. A thermostatic control of control means 250 monitors the air within the plenum 18 and, when it goes below the set temperature, actuates the heating means 28 to provide additional heat to the heat reservoir. Where a limited power supply of 110 volts is available, the thermostatic control is preferably limited to actuation of the heating means only when the magnetrons 110 (or optimally both the magnetrons 110 and blower 40) are deactuated, thereby to prevent an undue power drain. Alternatively, the thermostatic control may utilize a lower voltage for re-actuation of the heating means than was used during the preheat, again with the purpose of minimizing the power drain caused by re-actuation of the heating means.

In addition to actuating and deactuating the blower 40 and magnetrons 100, the control means 250 performs various functions relating to loading and unloading of the cooking chamber 16. In controlling the loading and unloading mechanisms (e.g., the shroud raising and lowering mechanism 81 and the cooking tray pivot mechanism 84), the control means 250 ensures that during the loading and unloading operations the shroud 80 is raised and the damper 50 is closed prior to moving the cooking tray 82 between its external or loading/unloading position and its internal or cooking position. As earlier noted, the control means 250 actuates the blower 40 and magnetrons 100 in timed relation to one another after the loading function, and ensures deactuation of both prior to the unloading function. The control means 250 also controls pivoting of the spokes of the loading tray 92 and cooking tray 82.

Exemplary of the rapid cooking times achievable with the present invention using a 110 volt power supply are 30 second cooks for frozen pre-cooked pizza, frozen raw thin-crust pizza, frozen pre-cooked chicken nuggets, and raw hamburger, and 15 seconds cooks for pre-cooked frozen french fries and raw biscuits. On the other hand, raw steak may take as much as 45 seconds. Thus most refrigerated and frozen products of the type sold in a fast food restaurant can be cooked within 30 seconds.

As illustrated, the energy sources (that is, the microwaves and the hot air) enter the cooking chamber 16 from opposite directions, with the air leaving the cooking chamber 16 from the same side (i.e., here, the bottom) as the microwaves are entering. As will be apparent to those skilled in the art, in other embodiments the energy sources may enter from the same direction or a perpendicular direction.

Operation of the oven according to the present invention is simple enough for use even by the relatively unskilled labor force employed in the typical fast food restaurant. The user places a refrigerated or frozen food product 12 to be cooked on the loading tray 92. If necessary, the user varies the microwave cooking time using the key M or the hot air impingement cooking time using the key A, along with the digital or numeric keys of the keypad. Otherwise, he relies upon the default values set at the factory. Presumably the establishment has already set the oven for the predetermined "set" temperature using the TEMP button and the digital keys of the keypad or relies upon the default value. The user has only to press the START button to set into operation the entire procedure.

The shroud 80 is then moved to the open or raised position by the shroud raising/lowering mechanism 81, and the cooking tray 82 pivoted outwardly from the cooking chamber 16 into the ledge 88 by its pivot mechanism 84. The spokes of the loading tray 92 next move to the vertical orientation, thus allowing the food product 12 to drop from the loading tray 92 onto the horizontally disposed spokes 86 of the cooking tray 82 within the ledge 88. The cooking tray 82 is next pivoted inwardly into the cooking chamber 16 by its pivot mechanism 84. Once the food product 12 and cooking tray 82 are within the cooking chamber 16, the shroud 80 is moved to its closed or lowered position and the damper 50 in the hot air duct is pivoted to its open orientation.

The magnetrons 100 and hot air blower 40 are then actuated according to the cycle times entered on the control panel 200 (or the default values). The microwaves generated by the magnetrons 100 are directed into the rectangular waveguide legs of the angled waveguide 102, and thence into and through the ceramic heat seal 110 and into the circular waveguide 106, which has previously been adjusted at the factory to ensure that the microwaves discharged by the circular waveguide 106 are properly focused through the ceramic disk 64 onto the food product 12. The blower 40 blows the already preheated air of the plenum 18 through the hot air duct 52 and hot air impingement tubes 54. The hot air jets from the hot air impingement tubes 54 strike the upper surface and the sides of the food product 12, from which they are reflected upwardly against the upper sidewall 60 of the food chamber 16 and thence downwardly toward the lower sidewall 62. The reflected hot air is intercepted by the ceramic disk 64 which then guides the hot air radially inwardly along the bottom surface of the food product 12 until the hot air can pass out of the cooking chamber 16 through the central aperture 66 of the ceramic disk 64. The hot air entering the central aperture 66 is blocked from further passage towards the magnetrons 100 by the heat seal 110 and thus passes through the slots 112 of the ceramic insert into the air holes 114 of the return air duct 120, thence returning via the blower 40 to the plenum 18 for reheating and recycling. Even where the impingement tubes 54 do not directly expose the sides of food product 12 to the impingement air, the blower 40 causes the hot air reflected from the food product 12 and upper sidewall surface 60 to be drawn downwardly about the sides of the food product and then across the bottom surface thereof.

When the food product 12 is cooked, as determined by the end of the last to terminate cooking means (or alternatively by actuation of the STOP button by the user), the loading function is reversed with the damper 50 being moved to its closed position, the shroud 80 being lifted to its open or raised position, and the cooking tray 82 pivoted outwardly from the cooking chamber 16 back into the ledge 88. Once the cooking tray 82 returns to the ledge 88, the spokes 86 thereof assume the vertical orientation and the cooking product 12 is dropped from the ledge 88 onto a plate 99 on ledge 88'. The cooking tray 82 is then returned to its original position within cooking chamber 16, and the shroud 80 is lowered to the closed or lowered position to conserve the heat in the cooking chamber 16.

As the cooking tray 82 itself is never touched by the employee, the danger of the user burning himself thereon is avoided. Similarly, as the damper 50 and shroud 80 minimize the escape of hot air from the oven 10, the operation of the oven is economical. Because the heating means is not recycled after each cook, but is generally maintained at an elevated temperature (being cooled at most once a day), maintenance of the oven is minimized.

It will be appreciated that, once the magnetrons 100 and blower 40 are deactuated by the control means 250 and the plenum 18 is sealed by return of the damper 50 to its closed position, the thermostatic control of the control means 250 actuates the heating means, as necessary, to return the air within the plenum to the "set" temperature.

As will also be readily apparent to those skilled in the cooking art, the oven of the present invention may be utilized either for hybrid cooking utilizing both microwaves and hot-air impingement, for microwave cooking alone (simply by not actuating the blower 40), or for hot-air impingement cooking alone (simply by not actuating the magnetrons 100). When the oven is not intended for hybrid use, the portions not pertinent to its intended use may be eliminated to reduce manufacturing costs or, alternatively, may be retained to enable the oven to be switched at a later date to another mode of operation (either the other single function or the hybrid function).

An extended cooking cycle will be required in a non-hybrid oven utilizing only hot-air impingement cooking where the food requires substantial internal heating (e.g., is frozen). However, a food product which requires more external cooking than internal cooking will not suffer as much from the elimination of microwave cooking. For example, where the food product has a large surface area-to-volume ratio—for example, pre-cooked, frozen french fries—the rapidly moving heated air can produce a french fry having a crisp outside without microwaves in about 30 seconds (about twice as long as it would take if there were also microwave cooking). Thus, the non-hybrid oven is primarily, but not exclusively, useful with non-frozen foods, although particular frozen foods having a large surface area-to-volume ratio may be productively used in such an oven.

To summarize, the present invention provides a quick-cooking oven, such as a hybrid oven utilizing hot-air impingement and microwave cooking, in order to cook many frozen or refrigerated food products within 30 seconds, or a non-hybrid oven which is generally capable of cooking most refrigerated food product within one minute. In a preferred embodiment, the oven is operable on a 110 volt power supply and is safe, simple, and economical to manufacture, use and maintain. The hybrid oven may also be used as a quick-cooking non-hybrid oven which cooks with hot-air impingement only, or a separate non-hybrid oven utilizing hot-air impingement cooking only may be provided.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A hybrid oven for cooking by both hot air impingement and microwave cooking, comprising:

(A) a housing defining a cooking chamber of given volume adapted to receive a food product for cooking, a hot air plenum configured and dimensioned to hold a volume of air and means for selectively providing gaseous communication therebetween;

(B) actuatable microwave cooking means for microwave cooking of the product in said cooking chamber;

(C) actuatable impingement-causing means for causing impingement of air from said plenum onto the food product in said cooking chamber;

(D) associated with said plenum, a thermal reservoir of high specific heat and high heat capacity relative to the air disposed in said plenum and heating means for maintaining said thermal reservoir at a high temperature; and (E) control means for actuating said microwave cooking means and said impingement-causing means in timed relation to one another.

2. The oven of claim 1 wherein said means for microwave cooking includes a pair of magnetrons and a common waveguide therefor having a pair of legs defining a right angle, said magnetrons being disposed perpendicular to said common waveguide and feeding the microwave output thereof into respective legs of said common waveguide.

3. The oven of claim 1 wherein said cooking chamber is configured and dimensioned to direct air from said plenum onto only one surface of the product in said cooking chamber and reflect such air back onto and across a substantial portion of a surface of the product opposed to such at least one surface.

4. The oven of claim 3 wherein said cooking chamber is configured and dimensioned to direct air from said plenum onto only surface and the sides of the product in said cooking chamber and reflect such air back onto and across a substantial portion of a surface of the product opposed to such one surface.

5. The oven of claim 3 wherein said cooking chamber includes means for restricting the passage of air from said cooking chamber to said plenum until the air has passed along substantially a radius of the opposed surface of the product.

6. The oven of claim 3 wherein said microwave cooking means directs microwaves towards said opposed surface of the product.

7. The oven of claim 5 wherein said restricting means is a centrally apertured refractory disc.

8. The oven of claim 3 wherein said cooking chamber has outwardly and downwardly extending upper sides above the food product and inwardly and downwardly extending lower sides below the food product, said upper and lower sides being configured and dimensioned such that at least some of the air reflected off the one product surface is redirected by both said upper and lower surfaces before being reflected onto and across the opposed produce surface.

9. The oven of claim 1 wherein said plenum has a volumetric capacity of at least 1.5 cubic feet of air in addition to said thermal reservoir and said heating means.

10. The oven of claim 1 wherein said plenum has a volumetric capacity, in addition to said thermal reservoir and said heating means, greater than that of said cooking chamber.

11. The oven of claim 1 wherein said thermal reservoir includes at least 60 pounds of metal.

12. The oven of claim 1 wherein said control means actuates said impingement-causing means substantially simultaneously with actuation of said microwave cooking means.

13. The oven of claim 1 wherein said control means actuates said impingement-causing means and said microwave cooking means so that both are active concurrently for a period of time.

14. The oven of claim 1 wherein said control means actuates said impingement-causing means at least about 2 seconds prior to actuation of said microwave cooking means.

15. The oven of claim 1 wherein said control means causes said heating means to initiate preheat of said thermal reservoir and the air in said plenum at least one hour prior to actuation of said impingement-causing means.

16. The oven of claim 1 wherein said means for selectively providing gaseous communication between said plenum and said cooking chamber precludes the passage of hot air from said plenum into said cooking chamber when said cooking chamber is not sealed, thereby to preclude hot air from said plenum escaping the oven through said cooking chamber.

17. The oven of claim 1 characterized by the capability of cooking and browning most frozen products placed in said cooking chamber within 30 seconds when said thermal reservoir and the air in said plenum are preheated.

18. The oven of claim 1 wherein said heating means has the capacity to preheat air in said plenum to at least 700° F.

19. The oven of claim 1 characterized by the ability to operate on a 110 volt power supply.

20. The oven of claim 1 wherein said control means actuates said heating means to preheat said thermal reservoir and the air in said plenum only prior to actuation of said impingement-causing means and, after deactuation of said microwave cooking means.

21. The oven of claim 1 wherein said control means actuates said heating means to preheat said thermal reservoir and the air in said plenum only prior to actuation of said impingement-causing means and, after deactuation of said microwave cooking means and said impingement-causing means.

22. The oven of claim 1 additionally including a cooking tray movable between a cooking position within said cooking chamber and a loading/unloading position outside of said cooking chamber, said cooking tray including a surface movable between a product-supporting orientation, wherein said supporting surface releasably supports the product, and an unloading orientation, wherein said supporting surface does not support the product thereon, thereby enabling the product to drop, said supporting surface being movable from said product-supporting orientation into said unloading orientation only when said cooking tray is in said loading/unloading position.

23. The oven of claim 22 additionally including a loading tray disposed above said cooking tray when said cooking tray is in said loading/unloading position, said loading tray including a product-receiving surface movable between a product supporting orientation, wherein said product-receiving surface supports the product, and a product releasing orientation, wherein said product-receiving surface does not support the product, thereby enabling the product to drop, said product-receiving surface being movable from said product-supporting orientation into said product-releasing orientation only when said cooking tray is in said loading/unloading position.

24. A hybrid oven for cooking by both hot air impingement and microwave cooking, comprising:

(A) a housing defining a cooking chamber of given volume adapted to receive a food product for cooking, a hot air plenum configured and dimensioned to hold a volume of air which is substantial relative to the volume of said cooking chamber, and means for selectively providing gaseous communication therebetween; said cooking chamber being configured and dimensioned to direct air from said plenum onto one surface of the product in said cooking chamber and reflect said air back onto a surface of the product opposed to said one surface, (B) actuatable microwave cooking means for microwave cooking of the product in said cooking chamber, including a pair of magnetrons and a common waveguide therefor having a pair of legs defining a right angle, said magnetrons being disposed perpendicular to said common waveguide and feeding the microwave input thereof into respective legs of said common waveguide, said microwave cooking means directing microwaves towards said opposed surface of the product;

(C) actuatable impingement-causing means for causing impingement of air from said plenum onto the product in said cooking chamber;

(D) in said plenum, a thermal reservoir of high specific heat and high heat capacity relative to the air disposed in said plenum and heating means for maintaining said thermal reservoir at at least 700° F. and (E) control means for actuating said heating means to preheat said thermal reservoir and the air in said plenum prior to actuation of said impingement-causing means, for actuating said microwave cooking means, and for actuating said impingement-causing means; both said microwave cooking means and said impingement-causing means being active concurrently for a period of time;

whereby actuation of said impingement-causing means causes the impingement of preheated air from said plenum through said communication means and onto the product in said cooking chamber, said oven being characterized by the capability of cooking and browning most frozen products placed in said cooking chamber when said thermal reservoir and the air in said plenum are preheated.

25. An oven for cooking at least in part by hot air impingement cooking, comprising:

(A) a housing defining a cooking chamber adapted to receive a food product for cooking, a hot air plenum configured and dimensioned to hold a volume of air, and means for selectively providing gaseous communication therebetween, said cooking chamber being configured and dimensioned to direct air from said plenum onto one surface of the product in said cooking chamber and thereafter reflect such air onto an surface of the product opposed to such one surface of the product, said cooking chamber additionally including a centrally apertured refractory disk restricting the passage of air from said cooking chamber to said plenum until the air has passed along substantially a radius of the opposed surface of the product;

(B) actuatable impingement-causing means for causing impingement of air from said plenum onto the product in said cooking chamber;

(C) associated with said plenum, a thermal reservoir and heating means for maintaining said thermal reservoir at a high temperature; and (D) control means for actuating said impingement-causing means.

26. An oven for cooking by hot air impingement comprising:

(A) a housing defining a cooking chamber of given volume adapted to receive a food product for cooking, a hot air plenum configured and dimensioned to hold a volume of air, and means for selectively providing gaseous communication therebetween;

(B) actuatable impingement-causing means for causing impingement of air from said plenum onto the product in said cooking chamber;

(C) associated with said plenum, a thermal reservoir of high specific heat and high heat capacity relative to the air disposed in said plenum and heating means for maintaining said thermal reservoir at a high temperature; and (E) control means for actuating said impingement-causing means and for actuating said heating means to initiate preheat of said thermal reservoir and the ambient air in said plenum prior to actuation of said impingement-causing means.

27. The oven of claim 26 wherein said cooking chamber is configured and dimensioned to direct air from said plenum onto only one surface of the product in said cooking chamber and reflect such air back onto and across a substantial portion of a surface of the product opposed to such one surface.

28. The oven of claim 26 wherein said cooking chamber is configured and dimensioned to direct air from said plenum onto one surface and the sides of the product in said cooking chamber and reflect air back onto and across a substantial portion of a surface of the product opposed to such one surface.

29. The oven of claim 27 additionally including means for restricting the passage of air from said cooking chamber to said plenum until the air has passed along substantially a radius of the opposed surface of the product.

30. The oven of claim 29 wherein said restricting means is a centrally apertured refractory disc.

31. The oven of claim 26 wherein said cooking chamber has outwardly and downwardly extending sides above the food product.

32. The oven of claim 26 wherein said plenum has a volumetric capacity, in addition to said thermal reservoir and said heating means, of at least 1.5 cubic feet of air.

33. The oven of claim 26 wherein said plenum has a volumetric capacity, in addition to said thermal reservoir and said heating means, greater than that of said cooking chamber.

34. The oven of claim 26 wherein said thermal reservoir includes at least 60 pounds of metal.

35. The oven of claim 26 wherein said control means actuates said heating means to preheat said thermal reservoir and the air in said plenum prior to actuation of said impingement-causing means.

36. The oven of claim 26 wherein said means for selectively providing gaseous communication between said plenum and said cooking chamber precludes the passage of hot air from said plenum into said cooking chamber when said cooking chamber is not sealed, thereby to preclude the escape of hot air from said plenum through said cooking chamber.

37. The oven of claim 26 characterized by the capability of cooking and browning a frozen or refrigerated product placed in said cooking chamber within one minute when said thermal reservoir and the air in said plenum are preheated.

38. The oven of claim 26 wherein said heating means has the capacity to preheat air in said plenum to at least 700° F.

39. The oven of claim 26 characterized by the ability to operate on a 110 volt power supply.

40. The oven of claim 26 additionally including a cooking tray movable between a cooking position within said cooking chamber and a loading/unloading position outside of said cooking chamber, said cooking tray including a surface movable between a product-supporting orientation, wherein said supporting surface releasably supports the product, and an unloading orientation, wherein said supporting surface does not support the product thereon, thereby enabling the product to drop, said supporting surface being movable from said product-supporting orientation into said unloading orientation only when said cooking tray is in said loading/unloading position.

41. The oven of claim 40 additionally including a loading tray disposed above said cooking tray when said cooking tray is in said loading/unloading position, said loading tray including a product-receiving surface movable between a product supporting orientation, wherein said product-receiving surface supports the product, and a product releasing orientation, wherein said product-receiving surface does not support the product, thereby enabling the product to drop, said product-receiving surface being movable from said product-supporting orientation into said product-releasing orientation only when said cooking tray is in said loading/unloading position.

42. An oven for cooking by hot air impingement comprising:

(A) a housing defining a cooking chamber of given volume adapted to receive a food product for cooking, a hot air plenum configured and dimensioned to hold a volume of air, and communication means for selectively providing gaseous communication therebetween;

(B) actuatable impingement-causing means for causing impingement of air from said plenum onto the product in said cooking chamber;

(C) in said plenum, a thermal reservoir of high specific heat and high heat capacity relative to the air disposed in said plenum and heating means for maintaining said thermal reservoir at at least 700° F.; and (D) control means for actuating said heating means to preheat said thermal reservoir and the air in said plenum at least one hour prior to actuation of said impingement-causing means;

whereby actuation of said impingement-causing means causes the impingement of preheated air from said plenum through said communication means and onto the product in said cooking chamber, said oven being characterized by the capability of cooking and browning most frozen or refrigerated products placed in said cooking chamber within one minute when said thermal reservoir and the air in said plenum are preheated.

* * * * *

UNITED STATES PATENT AND TRADEMARK OFFICE
CERTIFICATE OF CORRECTION

PATENT NO. : 5,254,823

DATED : October 19, 1993

INVENTOR(S) : McKee, et al.

It is certified that error appears in the above—identified patent and that said Letters Patent is hereby corrected as shown below:

Col. 18, claim 3 and 4, lines 47 and 53; Col. 21, claims 27 and 28, lines 50 and 56;

after "and" (first occurrence) add -- thereafter --; delete "back."

Col. 18,

Claim 4, line 3, after "only" add -- one --.

Signed and Sealed this

Seventh Day of November, 1995

Attest:

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,254,823

DATED : October 19, 1993

INVENTOR(S) : McKee, et al.

It is certified that error appears in the above-indentified patent and that said Letters Patent is hereby corrected as shown below:

Column 21, line 55, (claim 28), after "onto" add --only--.

Signed and Sealed this

Ninth Day of January, 1996

Attest:

BRUCE LEHMAN

*Attesting Officer* | *Commissioner of Patents and Trademarks*